United States Patent
Han et al.

(10) Patent No.: US 9,191,936 B2
(45) Date of Patent: *Nov. 17, 2015

(54) METHOD AND APPARATUS FOR TRANSMITTING CONTROL INFORMATION IN A WIRELESS COMMUNICATION SYSTEM

(71) Applicant: LG ELECTRONICS INC., Seoul (KR)

(72) Inventors: Seung Hee Han, Anyang-si (KR); Sung Ho Moon, Anyang-si (KR); Jae Hoon Chung, Anyang-si (KR); Moon Il Lee, Anyang-si (KR); Hyun Woo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,492

(22) Filed: Jan. 23, 2015

(65) Prior Publication Data
US 2015/0139154 A1 May 21, 2015

Related U.S. Application Data

(63) Continuation of application No. 14/308,417, filed on Jun. 18, 2014, now Pat. No. 9,008,031, which is a continuation of application No. 14/054,612, filed on Oct. 15, 2013, now Pat. No. 8,787,299, which is a
(Continued)

(30) Foreign Application Priority Data

Dec. 16, 2010 (KR) .................. 10-2010-0129073

(51) Int. Cl.
*H04W 72/04* (2009.01)
*H04L 1/16* (2006.01)
(Continued)

(52) U.S. Cl.
CPC ......... *H04W 72/0413* (2013.01); *H04L 1/0073* (2013.01); *H04L 1/1671* (2013.01);
(Continued)

(58) Field of Classification Search
CPC . H04W 72/0413; H04L 1/1671; H04L 5/001; H04L 27/2636; H04L 27/2697; H04L 5/0026; H04L 5/0053; H04L 5/0055
See application file for complete search history.

(56) References Cited

U.S. PATENT DOCUMENTS

| 8,588,166 B2 | 11/2013 | Han et al. |
| 2004/0042386 A1 | 3/2004 | Uesugi et al. |

(Continued)

OTHER PUBLICATIONS

Takahashi, et al., "Performance Comparison Between Cyclic Shift and Block Spreading CDMA Using MLD with Channel Coding Information for Uplink Control Signa s," Vehicular Technology Conference Fall (VTC 2009-Fall), 2009 IEEE 70th, Sep. 2009, 5 pages.

(Continued)

*Primary Examiner* — Mark Rinehart
*Assistant Examiner* — Gbemileke Onamuti
(74) *Attorney, Agent, or Firm* — Lee, Hong, Degerman, Kang & Waimey

(57) ABSTRACT

A method for transmitting a signal via physical uplink control channel (PUCCH) in a wireless communication system and an apparatus for performing the method are provided. Control information bits are modulated to generate N1 modulation symbols, wherein N1 is twice a number of subcarriers in one resource block (RB). The modulation symbols are spread by using various orthogonal codes to generate a plurality of sequences and the generated plurality of sequences are transmitted using different slots of a subframe through different antenna ports, each sequence of the plurality of sequences being mapped on a corresponding single carrier frequency division multiple access symbol in a corresponding slot.

20 Claims, 40 Drawing Sheets

Related U.S. Application Data continuation of application No. 13/390,508, filed as application No. PCT/KR2011/000289 on Jan. 14, 2011, now Pat. No. 8,588,166.

(60) Provisional application No. 61/361,903, filed on Jul. 6, 2010, provisional application No. 61/361,529, filed on Jul. 6, 2010, provisional application No. 61/301,160, filed on Feb. 3, 2010, provisional application No. 61/298,550, filed on Jan. 27, 2010, provisional application No. 61/295,741, filed on Jan. 17, 2010.

(51) Int. Cl.
| | |
|---|---|
| *H04L 5/00* | (2006.01) |
| *H04L 27/26* | (2006.01) |
| *H04B 7/06* | (2006.01) |
| *H04L 1/00* | (2006.01) |

(52) U.S. Cl.
CPC ............ *H04L 5/001* (2013.01); *H04L 5/0026* (2013.01); *H04L 5/0053* (2013.01); *H04L 5/0055* (2013.01); *H04L 27/2636* (2013.01); *H04L 27/2697* (2013.01); *H04B 7/068* (2013.01); *H04L 1/0057* (2013.01)

(56) References Cited

U.S. PATENT DOCUMENTS

| | | |
|---|---|---|
| 2008/0095106 A1 | 4/2008 | Malladi et al. |
| 2009/0129259 A1 | 5/2009 | Malladi et al. |
| 2009/0196366 A1 | 8/2009 | Shen et al. |
| 2009/0245284 A1 | 10/2009 | Xu et al. |
| 2009/0304109 A1 | 12/2009 | Kotecha |
| 2010/0002800 A1 | 1/2010 | Kim et al. |
| 2010/0232382 A1* | 9/2010 | Gauvreau et al. ............. 370/329 |
| 2011/0014884 A1 | 1/2011 | Noh et al. |
| 2012/0300726 A1 | 11/2012 | Han et al. |

OTHER PUBLICATIONS

LG Electronics, "Resource Allocation for Multi-Antenna Transmission in PUCCH Format 1/1a/1b," 3GPP TSG RAN WG1 #59bis, R1-100644, Jan. 2010, 4 pages.

Nokia Siemens Networks, et al., "Resource Allocation for PUCCH Format 1/1a/1b," 3GPP TSG RAN WG1 Meeting #58, R1-100321, Jan. 2010, 2 pages.

InterDigital Communications, LLC, 3GPP TSG-RAN WG1 Meeting #59bis, R1-100288, Jan. 2010, 8 pages.

Huawei, "Performance of UL Multiple Antenna Transmission for PUCCH," 3GPP TSG RAN WG1 #58, R1-093052, Aug. 2009, 8 pages.

3rd Generation Partnership Project (3GPP), "Technical Specification Group Radio Access Network; Evolved Universal Terrestrial Radio Access (E-UTRA); Physical Channels and Modulation (Release 8)," 3GPP TS 36.211 V8.5.0, Dec. 2008, 27 pages.

B. Classon et al., "Overview of UMTS Air-Interface Evolution", IEEE 64th Vehicular Technology Conference, Sep. 2006.

H.G. Myung, "Single Carrier FDMA", May 2008.

\* cited by examiner

FIG. 5
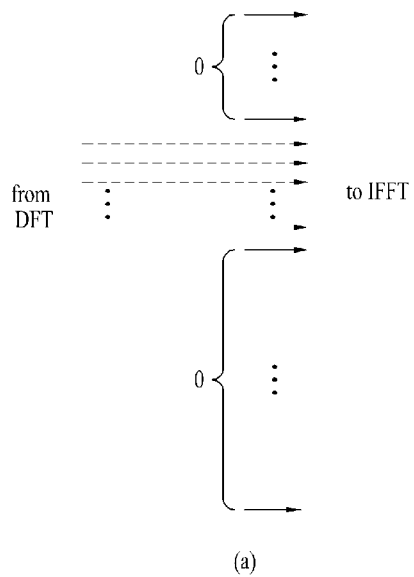
(a)
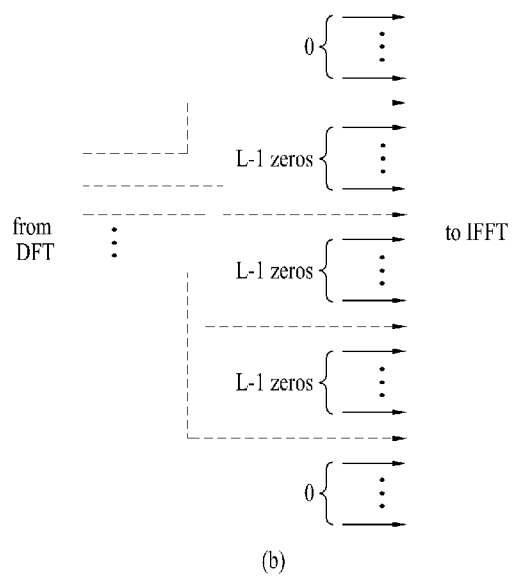
(b)

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\Delta_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| $n_{CS} = 1$ | $n_{CS} = 0$ | | | | | | |
| 2 | 1 | n'=0 | 6 | 12 | n'=0 | 6 | 12 |
| 3 | 2 | 1 | 7 | 13 | 1 | 7 | 13 |
| 4 | 3 | 2 | 8 | 14 | 2 | 8 | 14 |
| 5 | 4 | 3 | 9 | 15 | 3 | 9 | 15 |
| 6 | 5 | 4 | 10 | 16 | 4 | 10 | 16 |
| 7 | 6 | 5 | 11 | 17 | 5 | 11 | 17 |
| 8 | 7 | | | | | | |
| 9 | 8 | | | | | | |
| 10 | 9 | | | | | | |
| 11 | 10 | | | | | | |
| 0 | 11 | | | | | | |

$\Delta_{shift}^{PUCCH} \in \{\{1,2,3\}$ for normal cyclic prefix $\{1,2,3\}$ for extended cyclic prefix $\delta_{offset}^{PUCCH} \in \{0,1,...,\Delta_{shift}^{PUCCH} - 1\}$ Cell specific cyclic shift offset

- $n_{OC}$ : Orthogonal sequence index for ACK/NACK
- $\bar{n}_{OC}$ : Orthogonal sequence index for RS
- $n_{CS}$ : Cyclic shift value of a CAZAC sequence
- n' : ACK/NACK resource index used for the channelization in a RB

FIG. 18

Reuse of LTE PUCCH format 2 structure (extended CP case)

METHOD AND APPARATUS FOR TRANSMITTING CONTROL INFORMATION IN A WIRELESS COMMUNICATION SYSTEM

CROSS-REFERENCE TO RELATED APPLICATIONS

This application is a continuation of U.S. patent application Ser. No. 14/308,417, filed on Jun. 18, 2014 now U.S. Pat. No. 9,008,031, which is a continuation of U.S. patent application Ser. No. 14/054,612, filed on Oct. 15, 2013, now U.S. Pat. No. 8,787,299, which is a continuation of U.S. patent application Ser. No. 13/390,508, filed on Feb. 14, 2012, now U.S. Pat. No. 8,588,166, which is the National Stage filing under 35 U.S.C. 371 of International Application No. PCT/KR2011/000289, filed on Jan. 14, 2011, which claims the benefit of earlier filing date and right of priority to Korean Application No. 10-2010-0129073, filed on Dec. 16, 2010, and also claims the benefit of U.S. Provisional Application Nos. 61/361,903, filed on Jul. 6, 2010, 61/361,529, filed on Jul. 6, 2010, 61/301,160, filed on Feb. 3, 2010, 61/298,550, filed on Jan. 27, 2010, and 61/295,741, filed on Jan. 17, 2010, the contents of which are all hereby incorporated by reference herein in their entirety.

TECHNICAL FIELD

The present invention relates to a wireless communication system, and more particularly, to a method and apparatus for transmitting control information in a wireless communication system supporting carrier aggregation (CA).

BACKGROUND ART

Wireless communication systems have been diversified in order to provide various types of communication services such as voice or data service. In general, a wireless communication system is a multiple access system capable of sharing available system resources (bandwidth, transmit power or the like) so as to support communication with multiple users. Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and the like.

DISCLOSURE

Technical Problem

An object of the present invention is to provide a method and apparatus for efficiently transmitting control information in a wireless communication system. Another object of the present invention is to provide a channel format and a signal processing method and apparatus for efficiently transmitting control information. Another object of the present invention is to provide a method and apparatus for efficiently allocating resources used to transmit control information.

The technical problems solved by the present invention are not limited to the above technical problems and those skilled in the art can understand other technical problems from the following description.

Technical Solution

The object of the present invention can be achieved by providing a method of transmitting a physical uplink control channel (PUCCH) signal through multiple antennas at a user equipment (UE) in a wireless communication system, including obtaining a first modulation symbol sequence from control information, spreading one or more modulation symbols corresponding to each slot in the PUCCH signal of the first modulation symbol sequence so as to be corresponding to a plurality of single carrier frequency division multiple access (SC-FDMA) symbols in the each slot, to obtain per each slot a plurality of second spread modulation symbol sequences corresponding to the plurality of SC-FDMA symbols, and transmitting the plurality of second spread modulation symbol sequences through corresponding SC-FDMA symbols in the PUCCH signal through the multiple antennas, wherein resources used to transmit the PUCCH signal are orthogonal to each other between antenna ports.

In another aspect of the present invention, there is provided a user equipment configured to transmit a physical uplink control channel (PUCCH) signal through multiple antennas in a wireless communication system, including a wireless frequency (RF) unit, and a processor, wherein the processor is configured for obtaining a first modulation symbol sequence from control information, spreading one or more modulation symbols corresponding to each slot in the PUCCH signal of the first modulation symbol sequence so as to be corresponding to a plurality of single carrier frequency division multiple access (SC-FDMA) symbols in each slot, to obtain per each slot a plurality of second spread modulation symbol sequences corresponding to the plurality of SC-FDMA symbols, and transmitting the plurality of second spread modulation symbol sequences through corresponding SC-FDMA symbols in the PUCCH signal through the multiple antennas, and wherein resources used to transmit the PUCCH signal are orthogonal to each other between antenna ports.

The plurality of second spread modulation symbol sequences may be precoded for a single carrier property in a unit of SC-FDMA symbol.

Different orthogonal codes may be used in the spreading per each antenna port.

Physical resource blocks (PRBs) used for transmitting the PUCCH signal may be different between the antenna ports.

If PUCCH resource for a first antenna port is identified, PUCCH resource for a second antenna port may be calculated using the PUCCH resources for the first antenna port, and the PUCCH resources may include at least one of an orthogonal code and a physical resource block (PRB).

Advantageous Effects

According to the present invention, it is possible to efficiently transmit control information in a wireless communication system. In addition, it is possible to provide a channel format and a signal processing method for efficiently transmitting control information. In addition, it is possible to efficiently allocate resources used to transmit control information.

The effects of the present invention are not limited to the above-described effects and those skilled in the art can understand other effects from the following description.

DESCRIPTION OF DRAWINGS

The accompanying drawings which are included as a portion of the detailed description in order to help understanding of the present invention provide embodiments of the present invention and describes technical mapping of the present invention along with the detailed description.

FIG. 5 is a diagram showing a signal mapping scheme on a frequency domain satisfying a single carrier property.

FIG. 17 is a diagram showing ACK/NACK channelization of PUCCH formats 1a and 1b.

FIG. 18 is a diagram showing channelization of a structure in which PUCCH formats 1/1a/1b and formats 2/2a/2b are mixed within the same PRB.

MODE FOR INVENTION

The following technologies may be utilized in various wireless access systems such as a Code Division Multiple Access (CDMA) system, a Frequency Division Multiple Access (FDMA) system, a Time Division Multiple Access (TDMA) system, an Orthogonal Frequency Division Multiple Access (OFDMA) system, or a Single Carrier Frequency Division Multiple Access (SC-FDMA) system. The CDMA system may be implemented as radio technology such as Universal Terrestrial Radio Access (UTRA) or CDMA2000. The TDMA system may be implemented as radio technology such as Global System for Mobile communications (GSM)/ General Packet Radio Service (GPRS)/Enhanced Data Rates for GSM Evolution (EDGE). The OFDMA system may be implemented as radio technology such as IEEE 802.11 (Wi-Fi), IEEE 802.16 (WiMAX), IEEE 802-20 or E-UTRA (Evolved UTRA). The UTRA system is part of the Universal Mobile Telecommunications System (UMTS). A 3$^{rd}$ Generation Partnership Project Long Term Evolution (3GPP LTE) communication system is part of the E-UMTS (Evolved UMTS), which employs an OFDMA system in downlink and employs an SC-FDMA system in uplink. LTE-A (Advanced) is an evolved version of 3GPP LTE. In order to clarify the description, the 3GPP LTE/LTE-A will be focused upon, but the technical scope of the present invention is not limited thereto.

In a wireless communication system, a user equipment (UE) receives information from a base station (BS) in the downlink (DL) and transmits information to the BS in the uplink (UL). Information transmitted and received between the BS and the UE includes data and a variety of control information, and various physical channels are present according to the kind/usage of the transmitted and received information.

Figure 1:
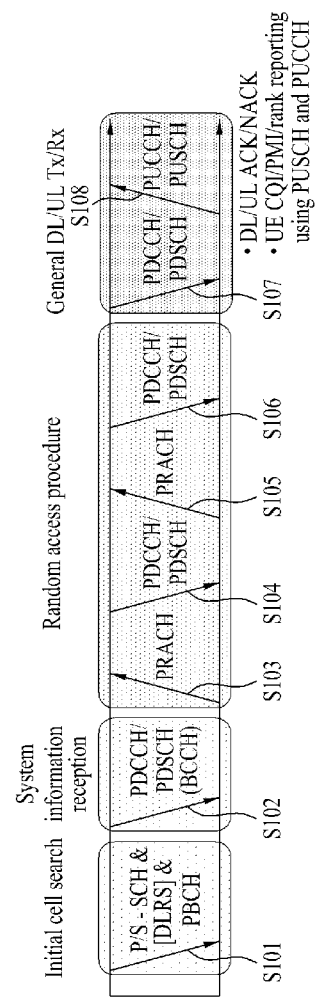
FIG. 1 is a view showing physical channels used for a 3$^{rd}$ Generation Partnership Project (3GPP) Long Term Evolution (LTE) system, which is an example of a wireless communication system, and a general signal transmission method using the same.

FIG. 1 is a view showing physical channels used for a 3$^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID. Thereafter, the UE may receive a physical broadcast channel from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S103 to S106, in order to complete the access to the eNB. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure. Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality indication (CQI), precoding matrix indication (PMI), rank indication (RI), etc. The UCI is generally transmitted via a PUCCH. However, in the case where control information and traffic data are simultaneously transmitted, the UCI may be transmitted via a PUSCH. The UCI may be aperiodically transmitted via a PUSCH according to a network request/instruction.

Figure 2:
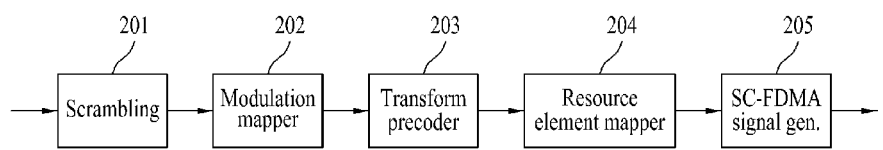
FIG. 2 is a diagram showing an uplink signal processing procedure.

FIG. 2 is a view explaining a signal processing procedure of transmitting a UL signal at a UE.

In order to transmit the UL signal, a scrambling module 201 of the UE may scramble a transmitted signal using a UE-specific scrambling signal. The scrambled signal is input to a modulation mapper 202 so as to be modulated into complex symbols by a Binary Phase Shift Keying (BPSK), Quadrature Phase Shift Keying (QPSK), 16-Quadrature amplitude modulation (QAM) or 64-QAM scheme according to the kind of the transmitted signal and/or the channel state. Thereafter, the modulated complex symbols are processed by a transform precoder 203 and are input to a resource element mapper 204. The resource element mapper 204 may map the complex symbols to time-frequency resource elements. The processed signal may be transmitted to the BS via an SC-FDMA signal generator 205 and an antenna.

Figure 3:
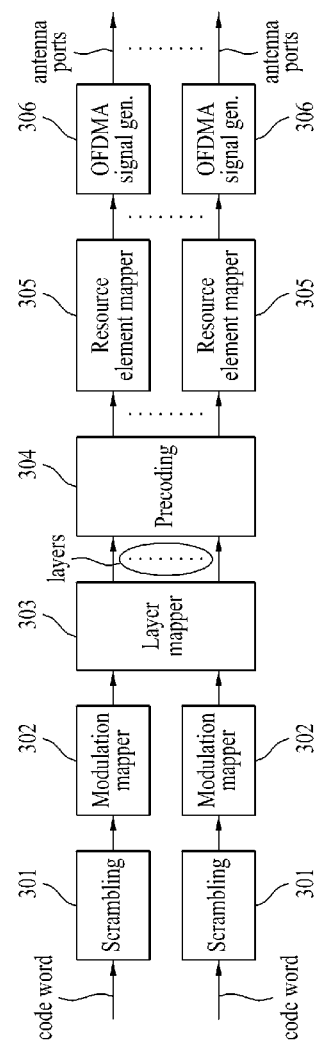
FIG. 3 is a diagram showing a downlink signal processing procedure.

FIG. 3 is a diagram explaining a signal processing procedure of transmitting a downlink (DL) signal at a BS.

In a 3GPP LTE system, the BS may transmit one or more codewords in the downlink. Accordingly, one or more codewords may be processed to configure complex symbols by scrambling modules 301 and modulation mappers 302, similar to the UL transmission of FIG. 2. Thereafter, the complex symbols are mapped to a plurality of layers by a layer mapper 303, and each layer may be multiplied by a precoding matrix by a precoding module 304 and may be allocated to each transmission antenna. The processed signals which will respectively be transmitted via antennas may be mapped to time-frequency resource elements by resource element mappers 305, and may respectively be transmitted via OFDM signal generators 306 and antennas.

In a wireless communication system, in a case where a UE transmits a signal in the uplink, a Peak-to-Average Ratio (PAPR) may be more problematic than the case where a BS transmits a signal in the downlink. Accordingly, as described above with reference to FIGS. 2 and 3, an OFDMA scheme is used to transmit a downlink signal, while an SC-FDMA scheme is used to transmit an uplink signal.

Figure 4:
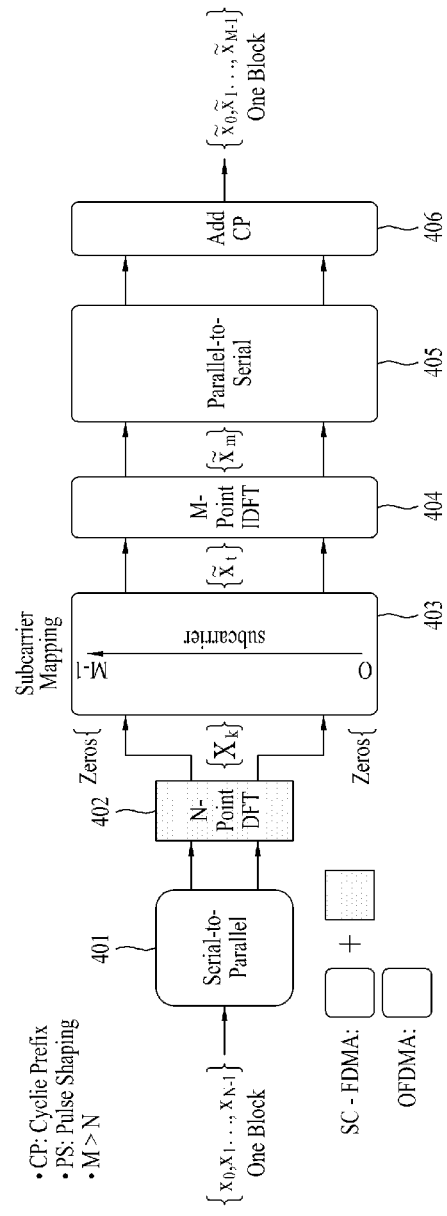
FIG. 4 is a diagram showing a Single Carrier Frequency Division Multiple Access (SC-FDMA) scheme and an Orthogonal Frequency Division Multiple Access (OFDMA) scheme.

FIG. 4 is a diagram explaining an SC-FDMA scheme and an OFDMA scheme. In the 3GPP system, the OFDMA scheme is used in the downlink and the SC-FDMA is used in the uplink.

Referring to FIG. 4, a UE for UL signal transmission and a BS for DL signal transmission are identical in that a serial-to-parallel converter 401, a subcarrier mapper 403 an M-point Inverse Discrete Fourier Transform (IDFT) module 404 and a Cyclic Prefix (CP) adding module 406 are included. The UE for transmitting a signal using an SC-FDMA scheme further includes an N-point DFT module 402. The N-point DFT module 402 partially offsets an IDFT process influence of the M-point IDFT module 404 such that the transmitted signal has a single carrier property.

FIG. 5 is a diagram explaining a signal mapping scheme in a frequency domain satisfying the single carrier property in the frequency domain. FIG. 5(a) shows a localized mapping scheme and FIG. 5(b) shows a distributed mapping scheme.

A clustered SC-FDMA scheme which is a modified form of the SC-FDMA scheme will now be described. In the clustered SC-FDMA scheme, DFT process output samples are divided into sub-groups in a subcarrier mapping process and are non-contiguously mapped in the frequency domain (or subcarrier domain).

Figure 6:
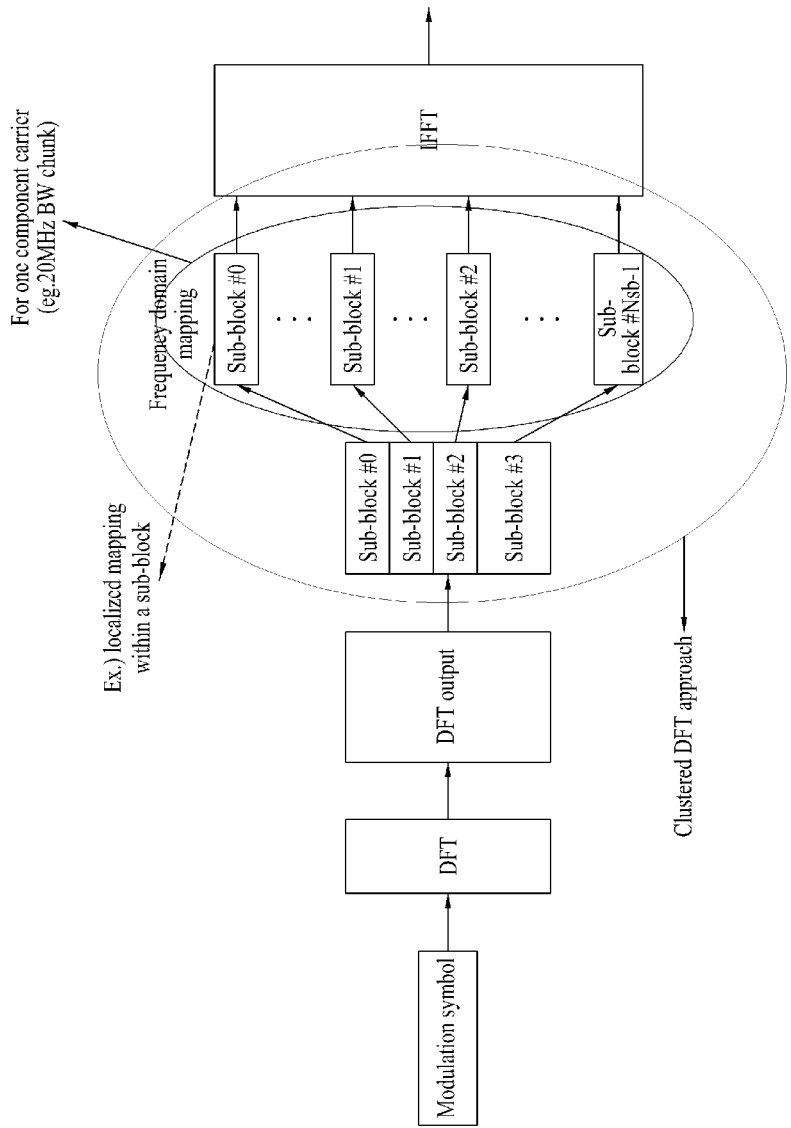
FIG. 6 is a diagram showing a signal processing procedure of mapping DFT process output samples to a single carrier in a clustered SC-FDMA.
Figure 7:
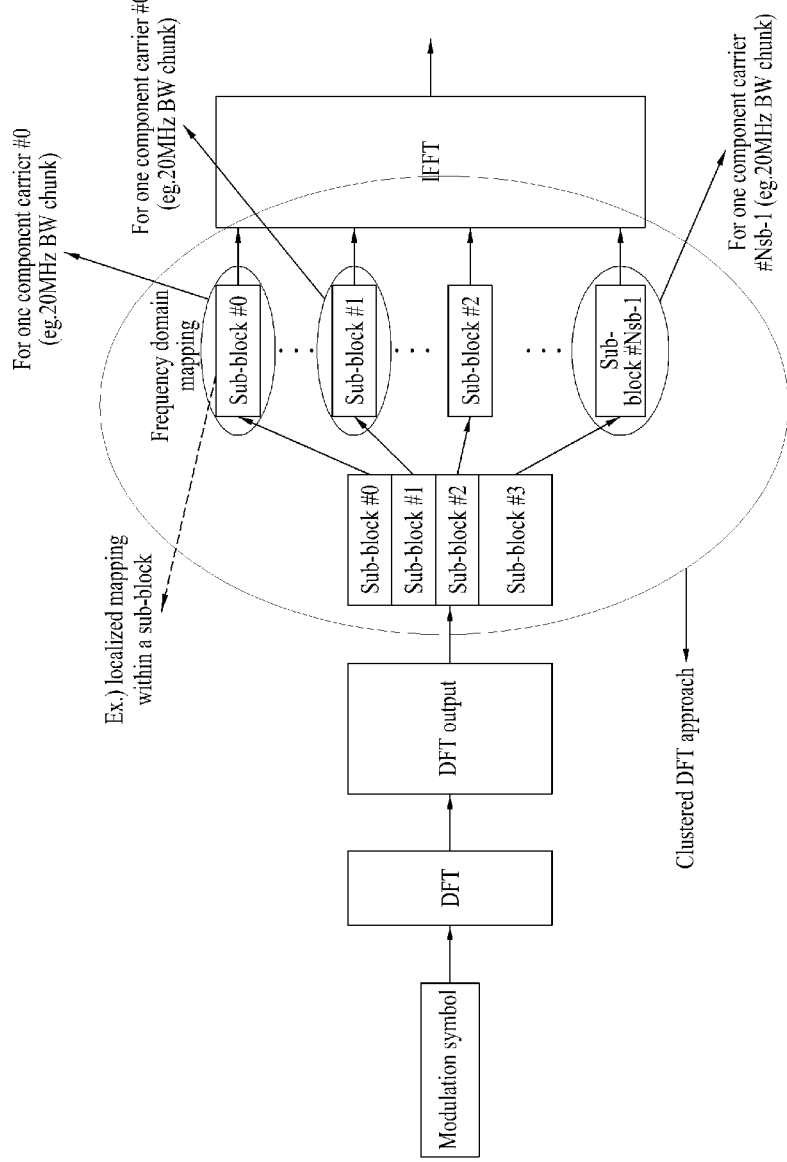
FIGS. 7 and 8 are diagrams showing a signal processing procedure of mapping DFT process output samples to multiple carriers in a clustered SC-FDMA scheme.
Figure 8:
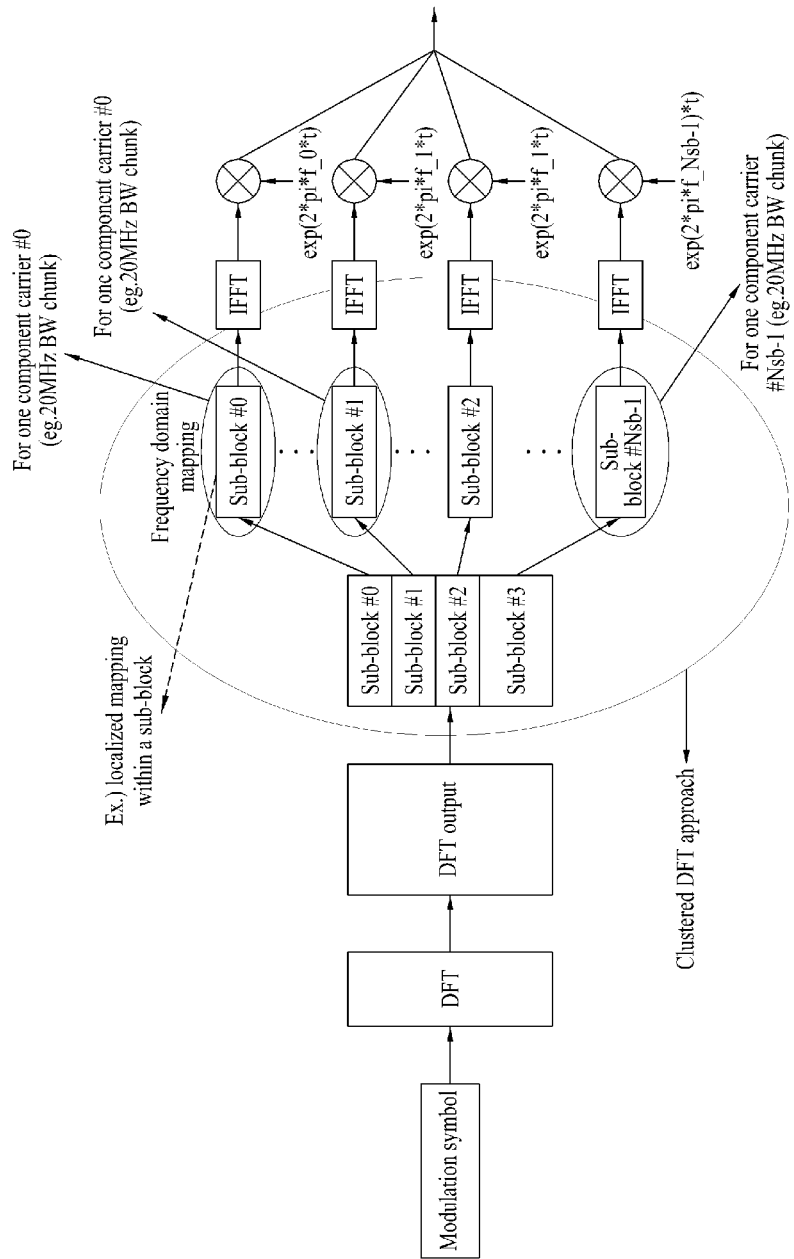

FIG. 6 is a diagram showing a signal processing procedure in which DFT process output samples are mapped to a single carrier in a clustered SC-FDMA scheme. FIGS. 7 and 8 are diagrams showing a signal processing procedure in which DFT process output samples are mapped to multiple carriers in a clustered SC-FDMA scheme. FIG. 6 shows an example of applying an intra-carrier clustered SC-FDMA scheme and FIGS. 7 and 8 show examples of applying an inter-carrier clustered SC-FDMA scheme. FIG. 7 shows the case where a subcarrier spacing between contiguous component carriers is set and a signal is generated by a single IFFT block in a state in which component carriers are contiguously allocated in a frequency domain and FIG. 8 shows the case where a signal is generated by a plurality of IFFT blocks in a state in which component carriers are non-contiguously allocated in a frequency domain.

Figure 9:
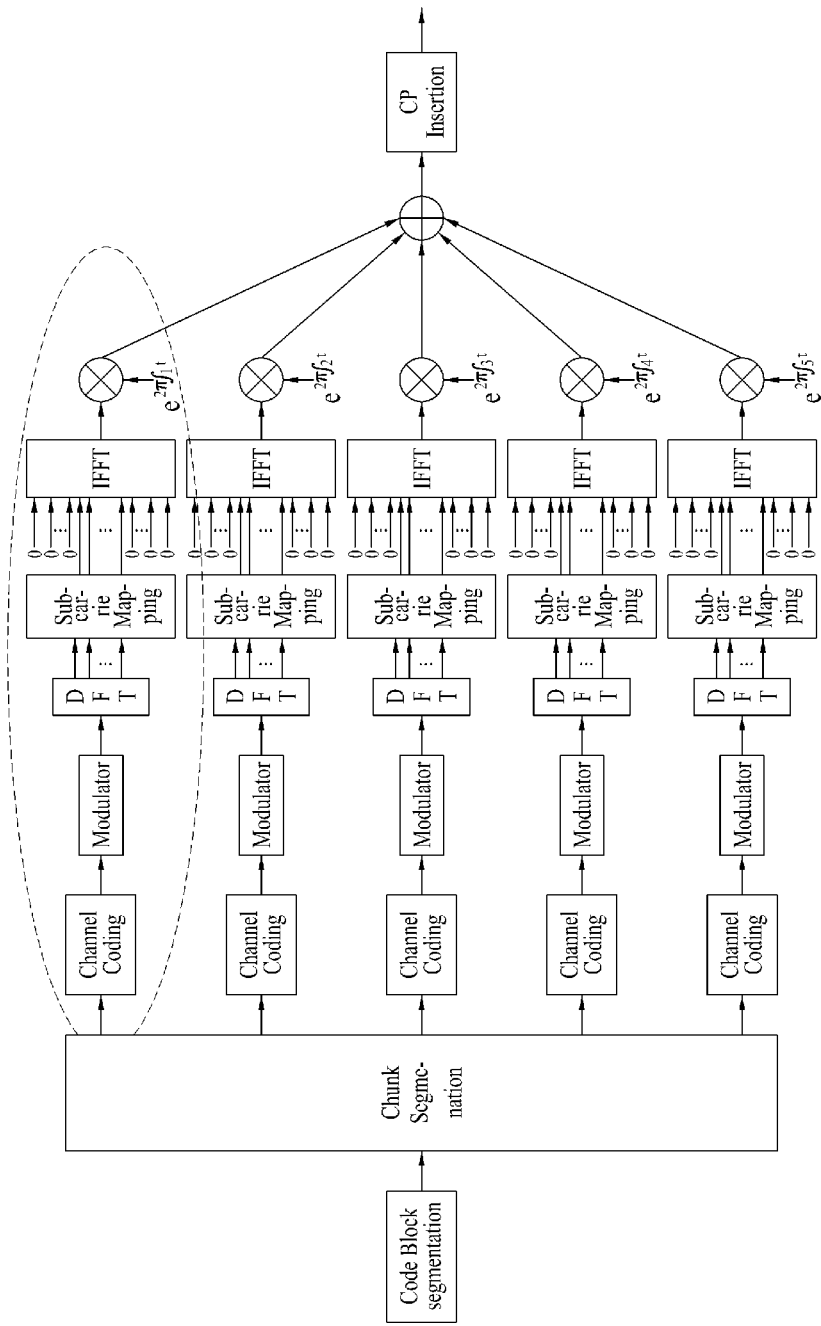
FIG. 9 is a diagram showing a signal processing procedure in a segmented SC-FDMA scheme.

FIG. 9 is a diagram showing a signal processing procedure in a segmented SC-FDMA scheme.

In the segmented SC-FDMA scheme, IFFTs corresponding in number to a certain number of DFTs are applied such that the DFTs and the IFFTs are in one-to-one correspondence and DFT spreading of the conventional SC-FDMA scheme and the frequency subcarrier mapping configuration of the IFFTs are extended. Therefore, the segmented SC-FDMA scheme also referred to as an NxSC-FDMA or NxDFT-s-OFDMA scheme. In the present invention, the generic term "segmented SC-FDMA" is used. Referring to FIG. 9, the segmented SC-FDMA scheme is characterized in that modulation symbols of an entire time domain are grouped into N (N is an integer greater than 1) groups and a DFT process is performed on a group unit basis, in order to relax a single carrier property.

Figure 10:
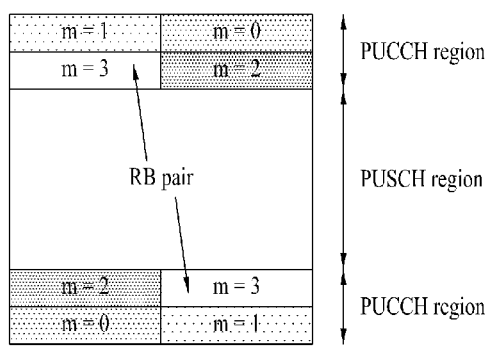
FIG. 10 is a diagram showing the structure of an uplink subframe.

FIG. 10 is a diagram showing the structure of a UL subframe.

Referring to FIG. 10, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The UL control information (that is, UCI) includes HARQ ACK/NACK, Channel Quality Information (CQI), Precoding Matrix Indicator (PMI) and Rank Indication (RI).

Figure 11:
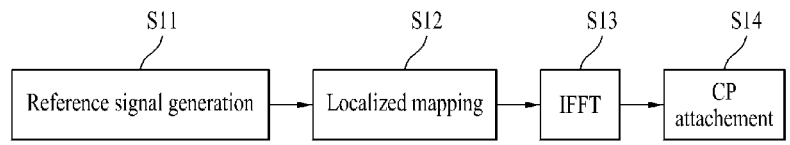
FIG. 11 is a diagram showing a signal processing procedure of transmitting a reference signal (RS) in the uplink.

FIG. 11 is a diagram illustrating a signal processing procedure for transmitting a Reference Signal (RS) in the uplink. As shown in FIG. 11, data is transformed into a frequency domain signal by a DFT precoder, subjected to frequency mapping and IFFT, and transmitted. In contrast, an RS does not pass through a DFT precoder. More specifically, an RS sequence is directly generated in a frequency domain (step 11), subjected to a localized-mapping process (step 12), subjected to IFFT (step 13), subjected to a CP attachment process (step 14), and transmitted.

The RS sequence $r_{u,v}^{(\alpha)}(n)$ is defined by cyclic shift a of a base sequence and may be expressed by Equation 1.

$$r_{u,v}^{(\alpha)}(n) = e^{j\alpha n} \bar{r}_{u,v}(n), 0 \le n < M_{sc}^{RS}$$  Equation 1 where, $M_{sc}^{RS} = mN_{sc}^{RB}$ denotes the length of the RS sequence, $N_{sc}^{RB}$ denotes the size of a resource block represented in subcarrier units, and m is $1 \le m \le N_{RB}^{max,UL}$. $N_{RB}^{max,UL}$ denotes a maximum UL transmission band.

A base sequence $\bar{r}_{u,v}(n)$ is grouped into several groups. $u \in \{0, 1, \ldots, 29\}$ denotes a group number, and v corresponds to a base sequence number in a corresponding group. Each group includes one base sequence v=0 with a length of $M_{sc}^{RS} = mN_{sc}^{RB}$ ($1 \le m \le 5$) and two base sequences v=0,1 with a length of $M_{sc}^{RS} = mN_{sc}^{RB}$ ($6 \le m \le N_{RB}^{max,UL}$). The sequence group number u and the number v within a corresponding group may be changed with time. Definition of the base sequence $\bar{r}_{u,v}(0), \ldots, \bar{r}_{u,v}(M_{sc}^{RS}-1)$ follows a sequence length $M_{sc}^{RS}$.

The base sequence having a length of $3N_{sc}^{RB}$ or more may be defined as follows.

With respect to $M_{sc}^{RS} \ge 3N_{sc}^{RB}$, the base sequence $\bar{r}_{u,v}(0), \ldots, \bar{r}_{u,v}(M_{sc}^{RS}-1)$ is given by the following Equation 2.

$$\bar{r}_{u,v}(n) = x_q(n \bmod N_{ZC}^{RS}), 0 \le n < M_{sc}^{RS}$$  Equation 2 where, a q-th root Zadoff-Chu sequence may be defined by the following Equation 3.

$$x_q(m) = e^{-j\frac{\pi q m(m+1)}{N_{ZC}^{RS}}}, 0 \le m \le N_{ZC}^{RS} - 1$$  Equation 3 where, q satisfies the following equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$  Equation 4 where, the length $N_{ZC}^{RS}$ of the Zadoff-Chue sequence is given by a largest prime number and thus $N_{ZC}^{RS} < M_{sc}^{RS}$ is satisfied.

A base sequence having a length of less than $3N_{sc}^{RB}$ may be defined as follows. First, with respect to $M_{sc}^{RS} = N_{sc}^{RB}$ and $M_{sc}^{RS} = 2N_{sc}^{RB}$, the base sequence is given as shown in Equation 5.

$$\bar{r}_{u,v}(n) = e^{j\phi(n)\pi/4}, 0 \le n \le M_{sc}^{RS} - 1$$  Equation 5 where, values $\phi(n)$ for $M_{sc}^{RS} = N_{sc}^{RB}$ and $M_{sc}^{RS} = 2N_{sc}^{RB}$ are given by the following Table 1, respectively.

TABLE 1

| u | $\phi(0), \ldots, \phi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | 3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

TABLE 2

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |

TABLE 2-continued

| u | $\phi(0), \ldots, \phi(23)$ | | | | | | | | | | | | | | | | | | | | | | | |
|---|---|---|---|---|---|---|---|---|---|---|---|---|---|---|---|---|---|---|---|---|---|---|---|---|
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | -3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

RS hopping will now be described.

The sequence group number u in a slot $n_s$ may be defined as shown in the following Equation 6 by a group hopping pattern $f_{gh}(n_s)$ and a sequence shift pattern $f_{ss}$.

$$u=(f_{gh}(n_s)+f_{ss}) \bmod 30 \quad \text{Equation 6}$$

where, mod denotes a modulo operation.

17 different hopping patterns and 30 different sequence shift patterns are present. Sequence group hopping may be enabled or disabled by a parameter for activating group hopping provided by a higher layer.

A PUCCH and a PUSCH may have the same hopping pattern, but have different sequence shift patterns.

The group hopping pattern $f_{gh}(n_s)$ is the same in the PUSCH and the PUCCH and is given by the following Equation 7.

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled} \end{cases} \quad \text{Equation 7}$$

where, c(i) denotes a pseudo-random sequence and a pseudo-random sequence generator may be initialized by $$c_{init} = \left\lfloor \frac{N_{ID}^{cell}}{30} \right\rfloor$$

at the start of each radio frame.

The PUCCH and the PUSCH are different in definition of the sequence shift pattern $f_{ss}$.

The sequence shift pattern $f_{ss}^{PUCCH}$ of the PUCCH is $f_{ss}^{PUCCH} = N_{ID}^{cell} \bmod 30$ and the sequence shift pattern $f_{ss}^{PUSCH}$ of the PUSCH is $f_{ss}^{PUSCH} = (f_{ss}^{PUCCH} + \Delta_{ss}) \bmod 30$. $\Delta_{ss} \in \{0, 1, \ldots, 29\}$ is configured by a higher layer.

Hereinafter, sequence hopping will be described.

Sequence hopping is applied only to a RS having a length of $M_{sc}^{RS} \geq 6N_{sc}^{RB}$.

With respect to an RS having a length of $M_{sc}^{RS} < 6N_{sc}^{RB}$, a base sequence number v within a base sequence group is v=0.

With respect to an RS having a length of $M_{sc}^{RS} \geq 6N_{sc}^{RB}$, a base sequence number v within a base sequence group in a slot $n_s$ is given by the following Equation 8.

$$v = \begin{cases} c(n_s) & \text{if group hopping is disabled and sequence hopping is enabled} \\ 0 & \text{otherwise} \end{cases} \quad \text{Equation 8}$$

where, c(i) denotes a pseudo-random sequence and a parameter for enabling sequence hopping provided by a higher layer determines whether sequence hopping is enabled. The pseudo-random sequence generator may be initialized by $$c_{init} = \left\lfloor \frac{N_{ID}^{cell}}{30} \right\rfloor \cdot 2^5 + f_{ss}^{PUSCH}$$

at the start of a radio frame.

An RS for a PUSCH is determined as follows.

The RS sequence $r^{PUSCH}(.)$ for the PUCCH is defined by $r^{PUSCH}(m \cdot M_{sc}^{RS}+n) = r_{u,v}^{(\alpha)}(n)$. m and n satisfy $n=0, \ldots, M_{sc}^{RS}-1$ $^{m=0,1}$ and satisfy $M_{sc}^{RS} = M_{sc}^{PUSCH}$.

In one slot, cyclic shift is $\alpha=2 n_{cs}/12$ along with $n_{cs} = (n_{DMRS}^{(1)} + n_{DMRS}^{(2)} + n_{PRS}(n_s)) \bmod 12$.

$n_{DMRS}^{(1)}$ is a broadcast value, $n_{DMRS}^{(2)}$ is given by UL scheduling allocation, and $n_{PRS}(n_s)$ is a cell-specific cyclic shift value. $n_{PRS}(n_s)$ varies according to a slot number $n_s$, and is $n_{PRS}(n_s) = \sum_{i=0}^{7} c(8 \cdot n_s + i) \cdot 2^i$.

c(i) is a pseudo-random sequence and c(i) is a cell-specific value. The pseudo-random sequence generator may be initialized by $$c_{init} = \left\lfloor \frac{N_{ID}^{cell}}{30} \right\rfloor \cdot 2^5 + f_{ss}^{PUSCH}$$

at the start of a radio frame.

Table 3 shows a cyclic shift field and $n_{DMRS}^{(2)}$ at a downlink control information (DCI) format 0.

TABLE 3

| Cyclic shift field at DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for a UL RS at a PUSCH is as follows.

A sequence is multiplied by an amplitude scaling factor $\beta_{PUSCH}$ and is mapped to the same set of a physical resource block (PRB) used for the corresponding PUSCH within the sequence started at $r^{PUSCH}(0)$. l=3 for a normal CP and l=2 for an extended CP. When the sequence is mapped to a resource element (k,l) within a subframe, the order of k is first increased and the slot number is then increased.

In summary, if a length is greater than and equal to $3N_{sc}^{RB}$, a ZC sequence is used along with cyclic extension. If a length is less than $3N_{sc}^{RB}$, a computer-generated sequence is used. Cyclic shift is determined according to cell-specific cyclic shift, UE-specific cyclic shift and hopping pattern.

Figure 12A:
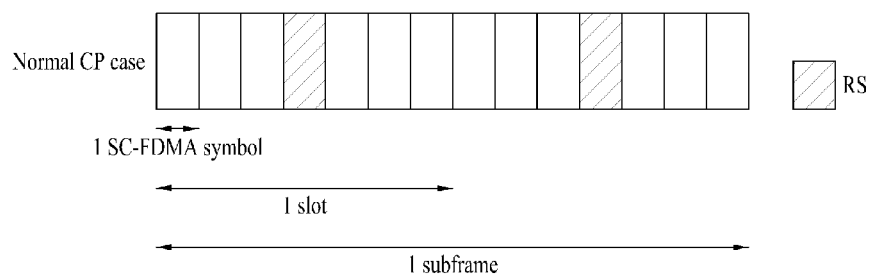
FIGS. 12A to 12B are diagrams showing a demodulation reference signal (DMRS) for a physical uplink shared channel (PUSCH).
Figure 12B:
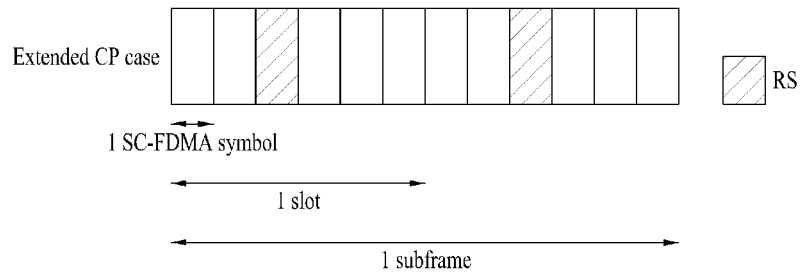

FIG. 12A is a diagram showing the structure of a demodulation reference signal (DMRS) for a PUSCH in the case of normal CP and FIG. 12B is a diagram showing the structure of a DMRS for a PUSCH in the case of extended CP. In FIG. 12A, a DMRS is transmitted via fourth and eleventh SC-FDMA symbols and, in FIG. 12B, a DMRS is transmitted via third and ninth SC-FDMA symbols.

FIGS. 13 to 16 show a slot level structure of a PUCCH format. The PUCCH includes the following formats in order to transmit control information.

(1) Format 1: This is used for on-off keying (OOK) modulation and scheduling request (SR)

(2) Format 1a and Format 1b: They are used for ACK/NACK transmission

1) Format 1a: BPSK ACK/NACK for one codeword

2) Format 1b: QPSK ACK/NACK for two codewords (3) Format 2: This is used for QPSK modulation and CQI transmission (4) Format 2a and Format 2b: They are used for CQI and ACK/NACK simultaneous transmission.

Table 4 shows a modulation scheme and the number of bits per subframe according to a PUCCH format. Table 5 shows the number of RSs per slot according to a PUCCH format. Table 6 shows SC-FDMA symbol locations of an RS according to a PUCCH format. In Table 4, the PUCCH formats 2a and 2b correspond to the normal CP case.

TABLE 4

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| PUCCH format | SC-FDMA symbol location of RS | |
|---|---|---|
| | Normal CP | Extended CP |
| 1, 1a, 1b | 2, 3, 4 | 2, 3 |
| 2, 2a, 2b | 1, 5 | 3 |

Figure 13:
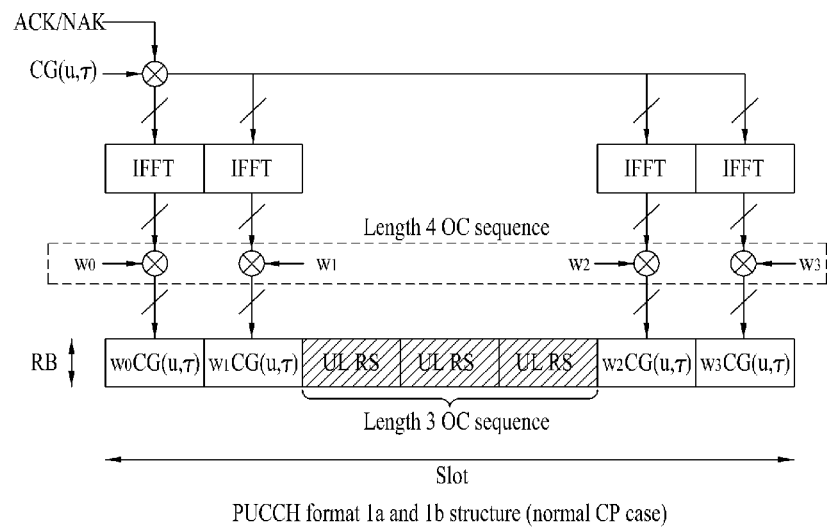
FIGS. 13 to 14 are diagrams showing slot level structures of physical uplink control channel (PUCCH) formats 1a and 1b.
Figure 14:
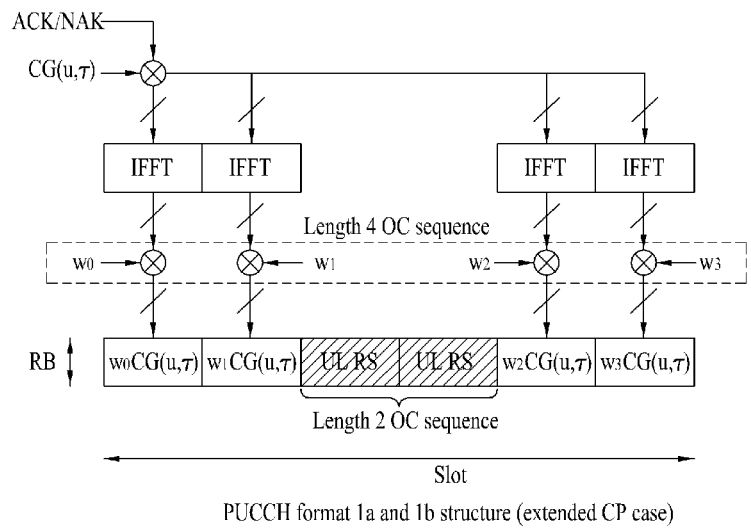

FIG. 13 shows PUCCH formats 1a and 1b in the normal CP case. FIG. 14 shows PUCCH formats 1a and 1b in the extended CP case. In the PUCCH formats 1a and 1b, the same control information is repeated within a subframe in slot units. Each UE transmits an ACK/NACK signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes). The OC includes, for example, a Walsh/DFT orthogonal code. If the number of CSs is 6 and the number of OCs is 3, a total of 18 UEs may be multiplexed in a PRB in the case of using a single antenna. Orthogonal sequences w0, w1, w2 and w3 may be applied in a certain time domain (after FFT modulation) or a certain frequency domain (before FFT modulation).

For SR and persistent scheduling, ACK/NACK resources including CSs, OCs and PRBs may be provided to a UE through radio resource control (RRC). For dynamic ACK/NACK and non-persistent scheduling, ACK/NACK resources may be implicitly provided to the UE by a lowest CCE index of a PDCCH corresponding to a PDSCH.

Figure 15:
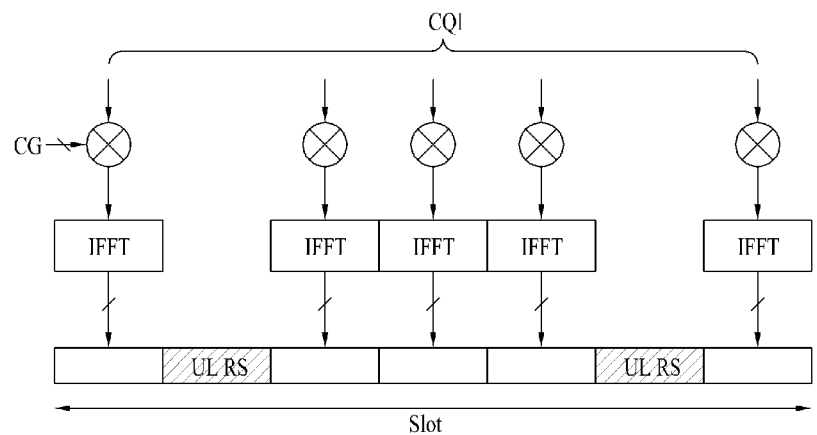
FIGS. 15 and 16 are diagrams showing slot level structures of PUCCH formats 2/2a/2b.
Figure 16:
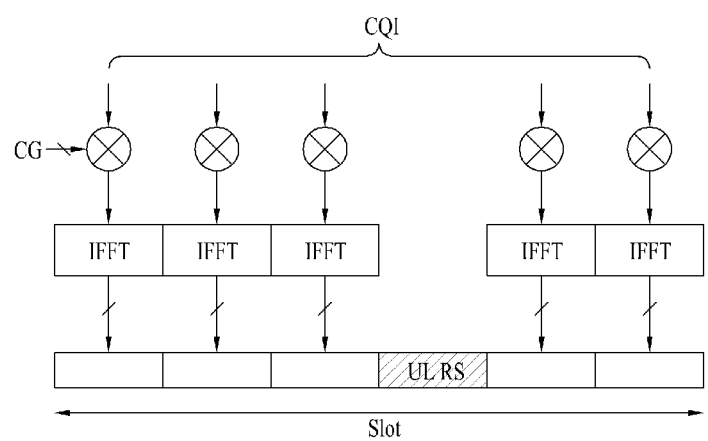

FIG. 15 shows a PUCCH format 2/2a/2b in the normal CP case. FIG. 16 shows a PUCCH format 2/2a/2b in the extended CP case. Referring to FIGS. 15 and 16, one subframe includes 10 QPSK data symbols in addition to an RS symbol in the normal CP case. Each QPSK symbol is spread in a frequency domain by a CS and is then mapped to a corresponding SC-FDMA symbol. SC-FDMA symbol level CS hopping may be applied in order to randomize inter-cell interference. RSs may be multiplexed by CDM using a CS. For example, if it is assumed that the number of available CSs is 12 or 6, 12 or 6 UEs may be multiplexed in the same PRB. For example, in the PUCCH formats 1/1a/1b and 2/2a/2b, a plurality of UEs may be multiplexed by CS+OC+PRB and CS+PRB.

Length-4 and length-3 OCs for PUCCH formats 1/1a/1b are shown in the following Tables 7 and 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | $[1\ e^{j2\pi/3}\ e^{j4\pi/3}]$ |
| 2 | $[1\ e^{j4\pi/3}\ e^{j2\pi/3}]$ |

The OCs for the RS in the PUCCH formats 1/1a/1b is shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | $[1\ e^{j2\pi/3}\ e^{j4\pi/3}]$ | [1 −1] |
| 2 | $[1\ e^{j4\pi/3}\ e^{j2\pi/3}]$ | N/A |

FIG. 17 is a diagram explaining ACK/NACK channelization for the PUCCH formats 1a and 1b. FIG. 17 shows the case of $\Delta_{shift}^{PUCCH}=2$.

Figure 18:
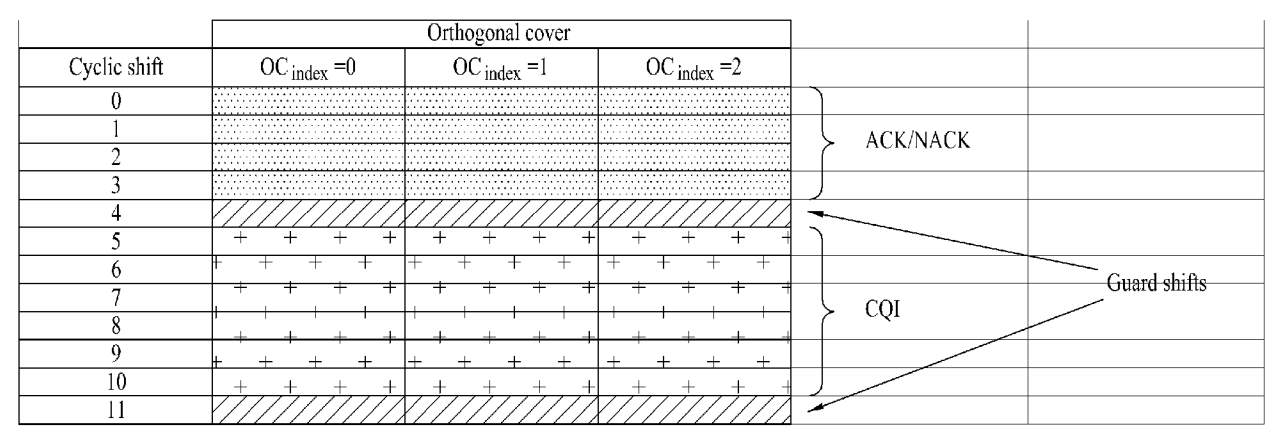

FIG. 18 is a diagram showing channelization of a structure in which PUCCH formats 1/1a/1b and formats 2/2a/2b are mixed within the same PRB.

CS hopping and OC remapping may be applied as follows.

(1) Symbol-based cell-specific CS hopping for inter-cell interference randomization (2) Slot level CS/OC remapping 1) for inter-cell interference randomization 2) slot-based access for mapping between ACK/NACK channels and resources k Resource $n_r$ for the PUCCH format 1/1a/1b includes the following combination.

(1) CS (=DFT OC in a symbol level) ($n_{cs}$)

(2) OC (OC in a slot level) ($n_{oc}$)

(3) frequency RB ($n_{rb}$)

When indexes representing the CS, the OC and the RB are respectively $n_{cs}$, $n_{oc}$ and $n_{rb}$, a representative index $n_r$ includes $n_{cs}$, $n_{oc}$ and $n_{rb}$. $n_r$ satisfies $n_r=(n_{cs}, n_{oc}, n_{rb})$.

A CQI, a PMI, a RI, and a combination of a CQI and ACK/NACK may be transmitted through the PUCCH formats 2/2a/2b. Reed Muller (RM) channel coding may be applied.

For example, in an LTE system, channel coding for a UL CQI is described as follows. A bit sequence $\alpha_0, \alpha_1, \alpha_2, \alpha_3, \ldots, \alpha_{A-1}$ is channel-coded using a (20, A) RM code. Table 10 shows a base sequence for the (20, A) code. $\alpha_0$ and $\alpha_{A-1}$ represent a Most Significant Bit (MSB) and a Least Significant Bit (LSB), respectively. In the extended CP case, a maximum information bit number is 11 except for the case where the CQI and the ACK/NACK are simultaneously transmitted. After the bit sequence is coded to 20 bits using the RM code, QPSK modulation may be applied. Before QPSK modulation, coded bits may be scrambled.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 0 | 0 | 1 | 0 | 1 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Channel coding bits $b_0, b_1, b_2, b_3, \ldots, b_{B-1}$ may be generated by Equation 9.

$$b_i = \sum_{n=0}^{A-1} (a_n \cdot M_{i,n}) \bmod 2 \quad \text{Equation 9}$$

where, $i=0, 1, 2, \ldots, B-1$ is satisfied.

Table 11 shows an uplink control information (UCI) field for wideband report (single antenna port, transmit diversity or open loop spatial multiplexing PDSCH) CQI feedback.

TABLE 11

| Field | bandwidth |
|---|---|
| Wideband CQI | 4 |

Table 12 shows a UCI field for wideband CQI and PMI feedback. The field reports closed loop spatial multiplexing PDSCH transmission.

TABLE 12

| Field | Bandwidth | | | |
|---|---|---|---|---|
| | 2 antenna ports | | 4 antenna ports | |
| | Rank = 1 | Rank = 2 | Rank = 1 | Rank >1 |
| Wideband CQI | 4 | 4 | 4 | 4 |
| Spatial differential CQI | 0 | 3 | 0 | 3 |
| PMI (Precoding Matrix Index) | 2 | 1 | 4 | 4 |

Table 13 shows a UCI field for RI feedback for wideband report.

TABLE 13

| Field | Bit widths | | |
|---|---|---|---|
| | | 4 antenna ports | |
| | 2 antenna ports | Maximum of two layers | Maximum of four layers |
| RI (Rank Indication) | 1 | 1 | 2 |

Figure 19:
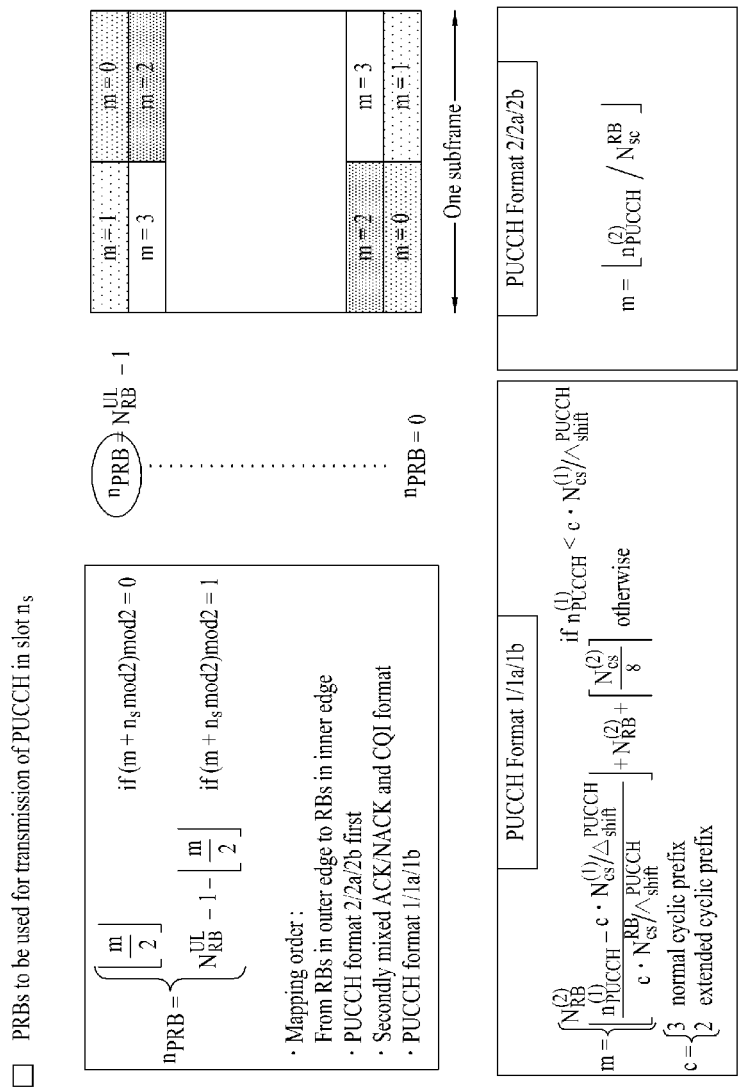
FIG. 19 is a diagram showing allocation of a PRB used to transmit a PUCCH.

FIG. 19 shows PRB allocation. As shown in FIG. 19, the PRB may be used for PUCCH transmission in a slot $n_s$.

A multi-carrier system or a carrier aggregation system refers to a system for aggregating and utilizing a plurality of carriers having a bandwidth smaller than a target bandwidth, for wideband support. When a plurality of carriers having a bandwidth smaller than a target bandwidth is aggregated, the bandwidth of the aggregated carriers may be limited to a bandwidth used in the existing system, for backward compatibility with the existing system. For example, the existing LTE system may support bandwidths of 1.4, 3, 5, 10, 15 and 20 MHz and an LTE-Advanced (LTE-A) system evolved from the LTE system may support a bandwidth greater than 20 MHz using only the bandwidths supported by the LTE system. Alternatively, regardless of the bandwidths used in the existing system, a new bandwidth may be defined so as to support CA. Multi-carrier may be used interchangeable with CA and bandwidth aggregation. CA includes contiguous CA and non-contiguous CA.

Figure 20:
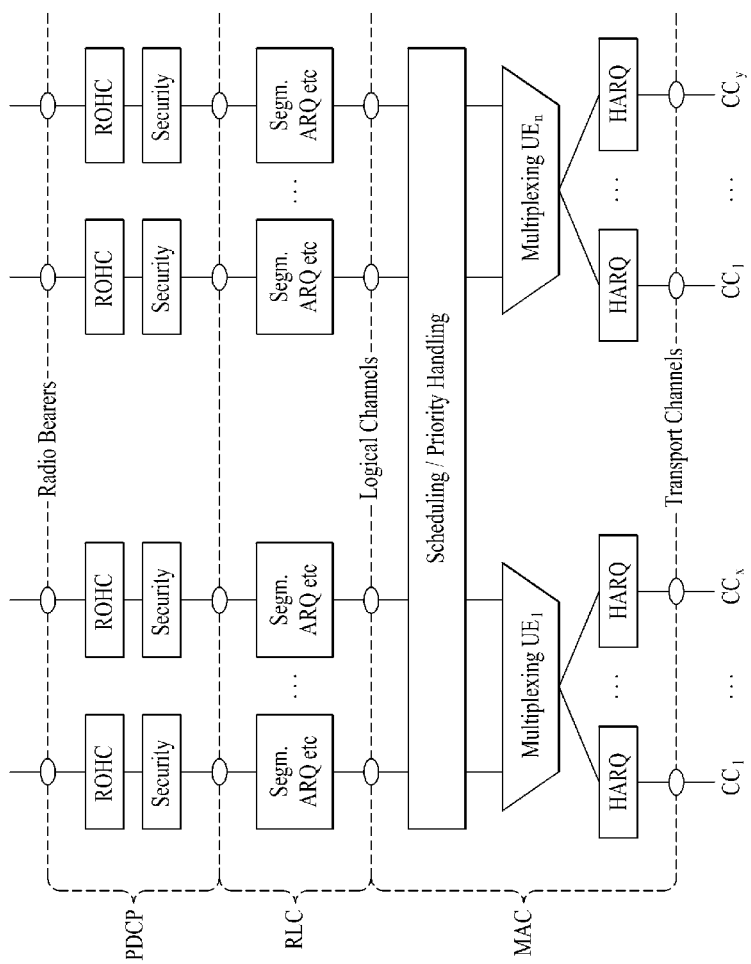
FIG. 20 is a conceptual diagram of management of a downlink component carrier in a base station (BS).
Figure 21:
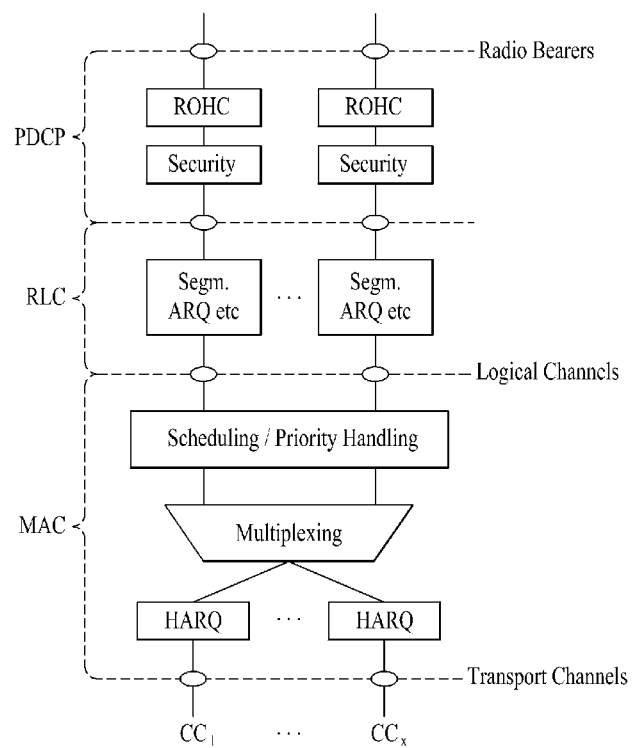
FIG. 21 is a conceptual diagram of management of an uplink component carrier in a user equipment (UE).

FIG. 20 is a conceptual diagram of management of a downlink component carrier in a BS, and FIG. 21 is a conceptual diagram of management of an uplink component carrier in a UE. For convenience of description, it is assumed that a higher layer is a MAC layer in FIGS. 20 and 21.

Figure 22:
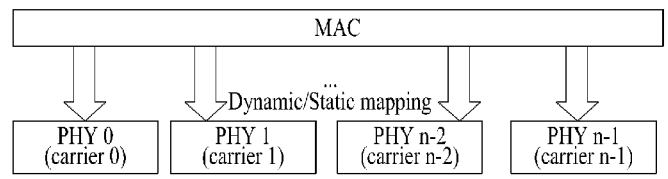
FIG. 22 is a conceptual diagram of the case where one MAC layer manages multiple carriers in a BS.
Figure 23:
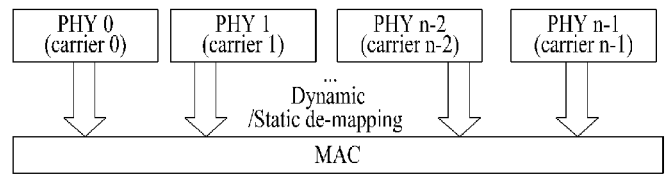
FIG. 23 is a conceptual diagram of the case where one MAC layer manages multiple carriers in a UE.

FIG. 22 is a conceptual diagram of the case where one MAC layer manages multiple carriers in a BS. FIG. 23 is a conceptual diagram of the case where one MAC layer manages multiple carriers in a UE.

Referring to FIGS. 22 and 23, one MAC layer manages one or more frequency carriers so as to perform transmission and reception. Since frequency carriers managed by one MAC layer do not need to be contiguous to each other, resource management is flexible. In FIGS. 22 and 23, one physical (PHY) layer means one component carrier, for convenience. One PHY layer does not necessarily mean an independent radio frequency (RF) device. In general, one independent RF device means one PHY layer, but the present invention is not limited thereto. One RF device may include several PHY layers.

Figure 24:
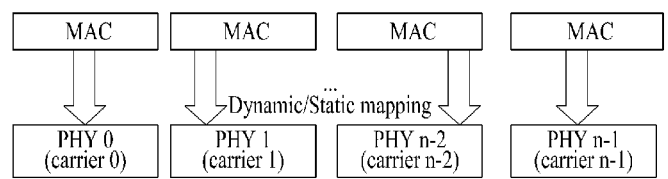
FIG. 24 is a conceptual diagram of the case where one MAC layer manages multiple carriers in a BS.
Figure 25:
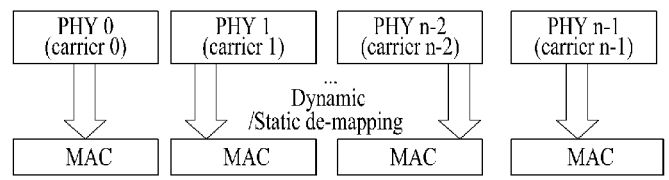
FIG. 25 is a conceptual diagram of the case where a plurality of MAC layers manages multiple carriers in a UE.

FIG. 24 is a conceptual diagram of the case where a plurality of MAC layers manages multiple carriers in a BS. FIG. 25 is a conceptual diagram of the case where a plurality of MAC layers manages multiple carriers in a UE, FIG. 26 is another conceptual diagram of the case where a plurality of MAC layers manages multiple carriers in a BS, and FIG. 27 is another conceptual diagram of the case where a plurality of MAC layers manages multiple carriers in a UE.

In addition to the structures shown in FIGS. 22 and 23, several MAC layers may control several carriers as shown in FIGS. 24 to 27.

Figure 26:
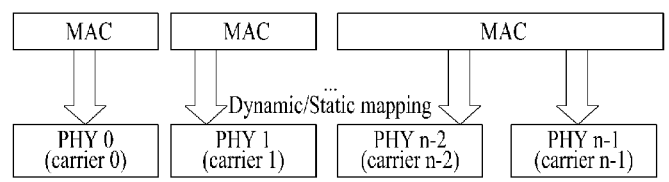
FIG. 26 is a conceptual diagram of the case where a plurality of MAC layers manages multiple carriers in a BS.
Figure 27:
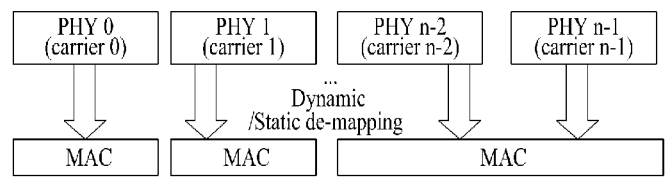
FIG. 27 is a conceptual diagram of the case where one or more MAC layers manages multiple carriers in view of reception of a UE.

Each MAC layer may control each carrier in one-to-one correspondence as shown in FIGS. 24 and 25 and each MAC layer may control each carrier in one-to-one correspondence with respect to some carriers and one MAC layer may control one or more carriers with respect to the remaining carriers as shown in FIGS. 26 and 27.

The system includes a plurality of carriers such as one carrier to N carriers and the carriers may be contiguous or non-contiguous, regardless of UL/DL. A TDD system is configured to manage a plurality (N) of carriers in DL and UL transmission. A FDD system is configured such that a plurality of carriers is used in UL and DL. In the case of the FDD system, asymmetric CA in which the number of carriers aggregated in UL and DL and/or the bandwidths of the carriers are different may be supported.

When the numbers of aggregated component carriers in UL and DL are identical, it is possible to configure all component carriers so as to enable backward compatibility with the existing system. However, component carriers which do not consider compatibility are not excluded from the present invention.

Hereinafter, for convenience of description, it is assumed that, when a PDCCH is transmitted through a DL component carrier #0, a PDSCH corresponding thereto is transmitted through a DL component carrier #0. However, cross-carrier scheduling may be applied and the PDSCH may be transmitted through another DL component carrier. The term "component carrier" may be replaced with other equivalent terms (e.g., cell).

Figure 28:
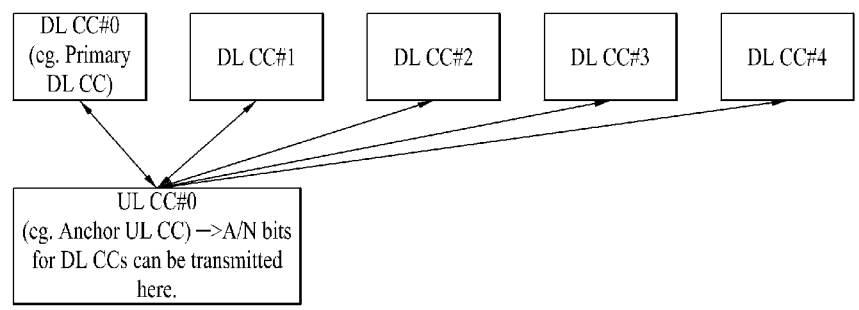
FIG. 28 is a diagram showing asymmetric carrier aggregation (CA) in which a plurality of downlink (DL) component carriers (CCs) and an uplink (UL) CC are linked.

FIG. 28 shows a scenario in which uplink control information (UCI) is transmitted in a wireless communication system supporting CA. For convenience, in the present example, it is assumed that the UCI is ACK/NACK (A/N). The UCI may include control information channel state information (e.g., CQI, PMI, RI, etc.) or scheduling request information (e.g., SR, etc.).

FIG. 28 is a diagram showing asymmetric CA in which five DL CCs and one UL CC are linked. The shown asymmetric CA is set from the viewpoint of UCI transmission. That is, a DL CC-UL CC linkage for UCI and a DL CC-UL CC linkage for data are differently set. For convenience, if it is assumed that one DL CC may transmit a maximum of two codewords, the number of UL ACK/NACK bits is at least two. In this case, in order to transmit ACK/NACK for data received through five DL CCs through one UL CC, ACK/NACK of at least 10 bits is necessary. In order to support a DTX state of each DL CC, at least 12 bits (=5^5=3125=11.61 bits) are necessary for ACK/NACK transmission. Since ACK/NACK of at most 2 bits may be transmitted in the existing PUCCH formats 1a/1b, such a structure cannot transmit extended ACK/NACK information. For convenience, although an example in which the amount of UCI information is increased due to CA is described, the amount of UCI information may be increased due to the increase in the number of antennas, existence of a backhaul subframe in a TDD system and a relay system, etc. Similarly to ACK/NACK, when control information associated with a plurality of DL CCs is transmitted through one UL CC, the amount of control information to be transmitted is increased. For example, in the case where a CQI for a plurality of DL CCs must be transmitted through a UL anchor (or primary) CC, CQI payload may be increased. The DL CC and the UL CC may be also referred to as a DL cell and a UL cell, respectively. The anchor DL CC and the anchor UL CC may be also referred to as a DL PCell (Primary cell) and a UL PCell, respectively.

A DL primary CC may be defined to a DL CC linked with a UL primary CC. Linkage includes implicit and explicit linkage. In the LTE, one DL CC and one UL CC are inherently paired. For example, by LTE pairing, a DL CC linked with a UL primary CC may be referred to as a DL primary CC. This may be regarded as implicit linkage. Explicit linkage indicates that a network configures linkage in advance and may be signaled by RRC, etc. In explicit linkage, a DL CC paired with a UL primary CC may be referred to as a primary DL CC. A UL primary (or anchor) CC may be a UL CC in which a PUCCH is transmitted. Alternatively, the UL primary CC may be a UL CC in which UCI is transmitted through a PUCCH or a PUSCH. A DL primary CC may be configured through high layer signaling. A DL primary CC may be a DL CC in which a UE performs initial access. DL CCs excluding the DL primary CC may be referred to as DL secondary CCs. Similarly, UL CCs excluding a UL primary CC may be referred to as UL secondary CCs.

Although asymmetric CA is focused upon in the present specification, this is only exemplary and the present invention is applicable to various CA scenarios including symmetric CA, without limitation.

Embodiment 1

A method of efficiently transmitting increased UL control information is proposed. More specifically, a new PUCCH format/signal processing procedure/resource allocation method for transmitting increased UL control information is proposed. For description, a PUCCH format proposed by the present invention is referred to as a new PUCCH format, an LTE-A PUCCH format or a PUCCH format 3 because the existing LTE PUCCH format is defined up to a PUCCH format 2. In order to facilitate understanding of the present invention, the case where multiple ACK/NACK bits are used as an example of increased control information will be mainly described in the following description. However, in the present invention, the scope of the control information is not limited to multiple ACK/NACK bits. The new PUCCH format and transmission method are as follows. The present invention includes not only the following formats but also other PUCCH formats.

Reuse PUCCH format 2
DFT based with CDM (time domain Walsh/DFT cover)
DFT based with CDM/FDM
SF reduction to 2
Channel selection with SF reduction to 2
MSM (Multi-sequence modulation) with SF reduction to 2

Figure 29:
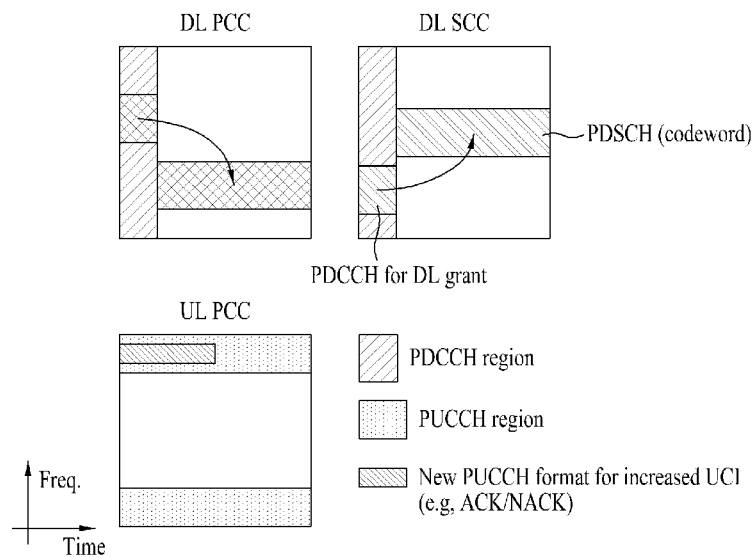
FIG. 29 is a diagram showing transmission of a signal through a PUCCH according to an embodiment of the present invention.

FIG. 29 shows a signal transmission using a new PUCCH format.

Referring to FIG. 29, one DL primary component carrier (PCC) and one DL secondary component carrier (SCC) are present. The DL PCC may be linked with the UL PCC. It is assumed that one DL grant is present each of the DL PCC and the DL SCC and a PDCCH is transmitted in each CC. In the case where two codewords (a total of four codewords) are transmitted in the DL CCs, 4 bits may be transmitted on the UL PCC through the new PUCCH format if a DTX state is not reported and 5 bits may be transmitted on the UL PCC through the new PUCCH format if the DTX state is reported.

Hereinafter, a DFT-based PUCCH format will be described in detail as an example of the new PUCCH format with reference to the drawings.

For convenience, the case where a UCI/RS symbol structure of the PUCCH format 1 of the existing LTE is used for a UCI/RS symbol structure of the new PUCCH format in a subframe/slot level will be mainly described, according to the embodiment of the present invention. However, in the shown PUCCH format, the UCI/RS symbol structure in the subframe/slot level is defined for convenience, and the present invention is not limited to a particular structure. In the PUCCH format according to the present invention, the number and locations of UCI/RS symbols may be freely changed according to system design. For example, the PUCCH format according to the embodiment of the present invention may be defined using the RS symbol structure of the PUCCH formats 2/2a/2b of the existing LTE.

The PUCCH format according to the embodiment of the present invention may be used to transmit UL control information of a certain kind/size. For example, the PUCCH format 3 according to the embodiment of the present invention may transmit information such as HARQ ACK/NACK, CQI, PMI, RI, or SR, which have payload having a certain size. For convenience of description, the case where the PUCCH format according to the present invention transmits ACK/NACK information will be mainly described in the drawings and embodiments.

FIGS. 30A to 30F show the structure of the new PUCCH format and a signal processing procedure therefore according to the present embodiment.

Figure 30A:
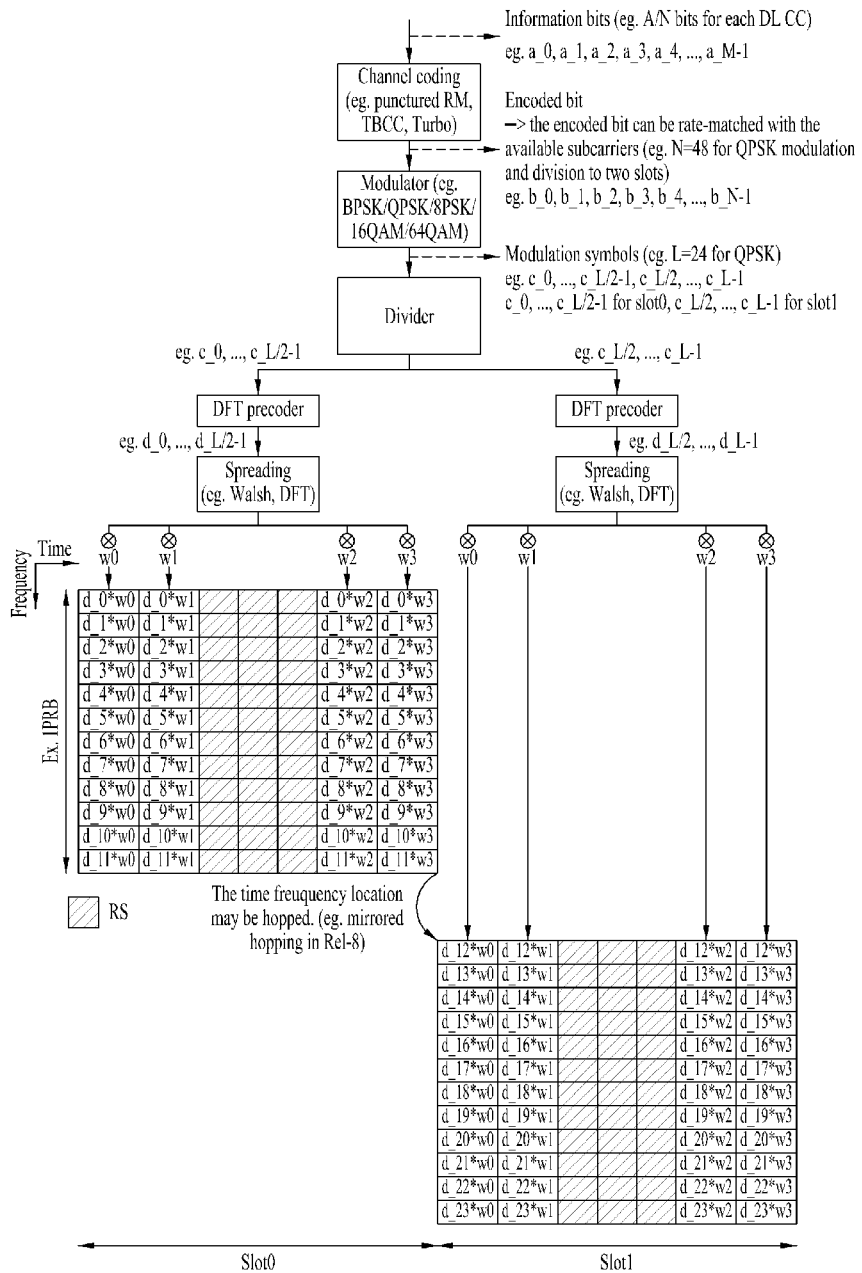
FIGS. 30A to 30F and 31 are diagrams showing a PUCCH format and a signal processing procedure therefor according to an embodiment of the present invention.

FIG. 30A shows the case where the PUCCH format according to the present embodiment is applied to the structure of the PUCCH format 1 (normal CP). Referring to FIG. 30A, a channel coding block channel-codes information bits $a\_0, a\_1, \ldots,$ and $a\_M\text{-}1$ (e.g., multiple ACK/NACK bits) and generates encoded bits (coded bits or coding bits) (or codewords) $b\_0, b\_1, \ldots,$ and $b\_N\text{-}1$. M denotes the size of the information bits and N denotes the size of the encoded bits. The information bits include UCI, for example, multiple ACK/NACK bits for a plurality of data (or PDSCHs) received through a plurality of DL CCs. The information bits $a\_0, a\_1, \ldots,$ and $a\_M\text{-}1$ are joint-coded regardless of the kind/number/size of UCI configuring the information bits. For example, if the information bits include multiple ACK/NACK bits for a plurality of DL CCs, channel coding is performed not with respect to each DL CC or each ACK/NACK bit, but with respect to entire bit information. Thus, a single codeword is generated. Channel coding includes but not limited to simplex repetition, simplex coding, Reed Muller (RM) coding, punctured RM coding, tail-biting convolutional coding (TBCC), low-density parity-check (LDPC) and turbo-coding. Although not shown, the encoded bits can be rate-matched in consideration of a modulation order and the amount of resources. The rate-matching function may be included in the channel coding block or may be performed using a separate functional block. For example, the channel coding block may perform (32, 0) RM coding with respect to a plurality of control information so as to obtain a single codeword and perform circular buffer rate-matching.

A modulator modulates the encoded bits $b\_0, b\_1, \ldots,$ and $b\_N\text{-}1$ and generates modulation symbols $c\_0, c\_1, \ldots,$ and $c\_L\text{-}1$. L denotes the size of the modulation symbols. The modulation method is performed by changing the amplitude and phase of the transmitted signal. The modulation method includes, for example, n-phase shift keying (PSK) and n-quadrature amplitude modulation (QAM) (n is an integer greater than or equal to 2). More specifically, the modulation method may include binary PSK (BPSK), quadrature PSK (QPSK), 8-PSK, QAM, 16-QAM, 64-QAM, etc.

A divider divides the modulation symbols $c\_0, c\_1, \ldots,$ and $c\_L-1$ into slots. The order/pattern/method of dividing the modulation symbols to slots is not specially limited. For example, the divider may divide the modulation symbols to slots sequentially from the head (local type). In this case, as shown, the modulation symbols $c\_0, c\_1, \ldots,$ and $c\_L/2-1$ may be divided to a slot 0 and the modulation symbols $c\_L/2, c\_L/2+1, \ldots,$ and $c\_L-1$ may be divided to a slot 1. The modulation symbols may be interleaved (or permutated) when being divided to the slots. For example, even-numbered modulation symbols may be divided to the slot 0 and odd-numbered modulation symbols may be divided to the slot 1. The order of the modulation process and the division process may be changed. Instead of dividing different coding bits into slots, the same coding bits may be configured to be repeated in slot units. In this case, the divider may be omitted.

A DFT precoder performs DFT precoding (e.g., 12-point DFT) with respect to the modulation symbols divided to the slots, in order to generate a single carrier waveform. Referring to the drawing, the modulation symbols $c\_0, c\_1, \ldots,$ and $c\_L/2-1$ divided to the slot 0 are DFT-precoded to DFT symbols $d\_0, d\_1, \ldots,$ and $d\_L/2-1$, and the modulation symbols $c\_L/2, c\_L/2+1, \ldots,$ and $c\_L-1$ divided to the slot 1 are DFT-precoded to DFT symbols $d\_L/2, d\_L/2+1, \ldots,$ and $d\_L-1$. DFT precoding may be replaced with another linear operation (e.g., Walsh precoding). The DFT precoder may be replaced with a CAZAC modulator. The CAZAC modulator modulates the modulation symbols $c\_0, c\_1, \ldots,$ and $c\_L/2-1$ and $c\_L/2, c\_L/2+1, \ldots,$ and $c\_L-1$ divided to the slots with corresponding sequences and generate CAZAC modulation symbols $d\_0, d\_1, \ldots, d\_l/2-1$ and $d\_L/2, d\_L/2+1, \ldots,$ and $d\_L-1$. The CAZAC modulator includes, for example, CAZAC sequences or sequences for LTE computer generated (CG) 1 RB. For example, if the LTE CG sequences are $r\_0, \ldots,$ and $r\_L/2-1$, the CAZAC modulation symbols may be $d\_n=c\_n*r\_n$ or $d\_n=\text{conj}(c\_n)*r\_n$.

A spreading block spreads a signal subjected to DFT at an SC-FDMA symbol level (time domain). Time domain spreading of the SC-FDMA symbol level is performed using a spreading code (sequence). The spreading code includes a quasi-orthogonal code and an orthogonal code. The quasi-orthogonal code includes, but is not limited to, a pseudo noise (PN) code. The orthogonal code includes, but is not limited to, a Walsh code and a DFT code. Although the orthogonal code is described as a representative example of the spreading code for ease of description in the present specification, the orthogonal code is only exemplary and may be replaced with a quasi-orthogonal code. A maximum value of a spreading code size (or a spreading factor (SF)) is restricted by the number of SC-FDMA symbols used to transmit control information. For example, in the case where four SC-FDMA symbols are used to transmit control information in one slot, (quasi-)orthogonal codes w0, w1, w2 and w3 having a length of 4 may be used in each slot. The SF means the spreading degree of the control information and may be associated with the multiplexing order of a UE or the multiplexing order of an antenna. The SF may be changed to 1, 2, 3, 4, ... according to requirements of the system and may be defined between a BS and a UE in advance or may be informed to the UE through DCI or RRC signaling. For example, in the case where one of SC-FDMA symbols for control information is punctured in order to transmit an SRS, a spreading code with a reduced SF (e.g., SF=3 instead of SF=4) may be applied to the control information of the slot.

The signal generated through the above procedure is mapped to subcarriers in a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, each procedure will be described in detail. In the case where each DL CC may transmit two PDSCHs, the number ACK/NACK bits may be 12 if a DTX state is included. In consideration of QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 DFT symbols by a 12-point DFT operation. In each slot, 12 DFT symbols are spread to four SC-FDMA symbols using the spreading code having SF=4 in a time domain and are mapped. Since 12 bits are transmitted through [2 bits*12 subcarriers+8 SC-FDMA symbols], the coding rate is 0.0625 (=12/192). In case of SF=4, a maximum of four UEs may be multiplexed per 1 PRB.

The signal processing procedure described with reference to FIG. 30A is only exemplary and the signal mapped to the PRB in FIG. 30A may be obtained using various equivalent signal processing procedures. The signal processing procedures equivalent to FIG. 30A will be described with reference to FIGS. 30B to 30F.

Figure 30B:
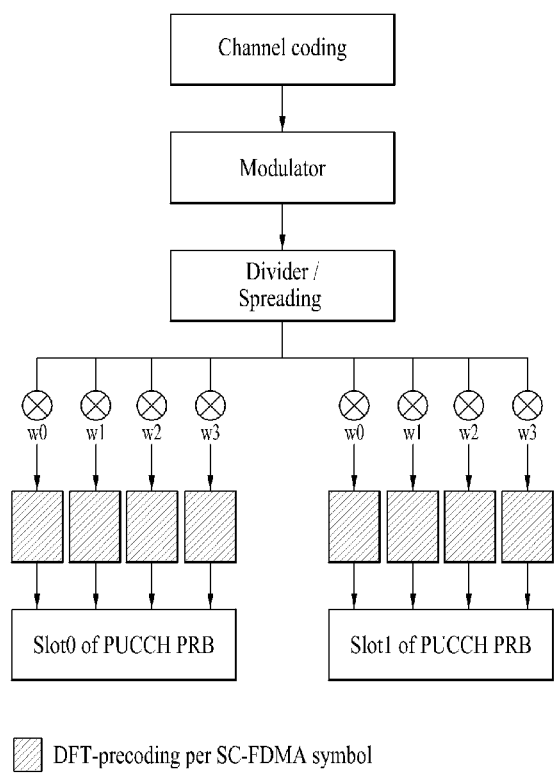

FIG. 30B is different from FIG. 30A in the order of the DFT precoder and the spreading block. In FIG. 30A, since the function of the spreading block is equal to multiplication of a DFT symbol sequence output from the DFT precoder by a specific constant at an SC-FDMA symbol level, the value of the signal mapped to the SC-FDMA symbols is identical even when the order of the DFT precoder and the spreading block is changed. Accordingly, the signal processing procedure for the PUCCH format 3 may be performed in order of channel coding, modulation, division, spreading and DFT precoding. In this case, the division process and the spreading process may be performed by one functional block. For example, the modulation symbols may be spread at the SC-FDMA symbol level while being alternately divided to slots. As another example, the modulation symbols are copied to suit the size of the spreading code when the modulation symbols are divided to slots, and the modulation symbols and the elements of the spreading code may be multiplied in one-to-one correspondence. Accordingly, the modulation symbol sequence generated in each slot is spread to a plurality of SC-FDMA symbols at the SC-FDMA symbol level. Thereafter, the complex symbol sequence corresponding to each SC-FDMA symbol is DFT-precoded in SC-FDMA symbol units.

Figure 30C:
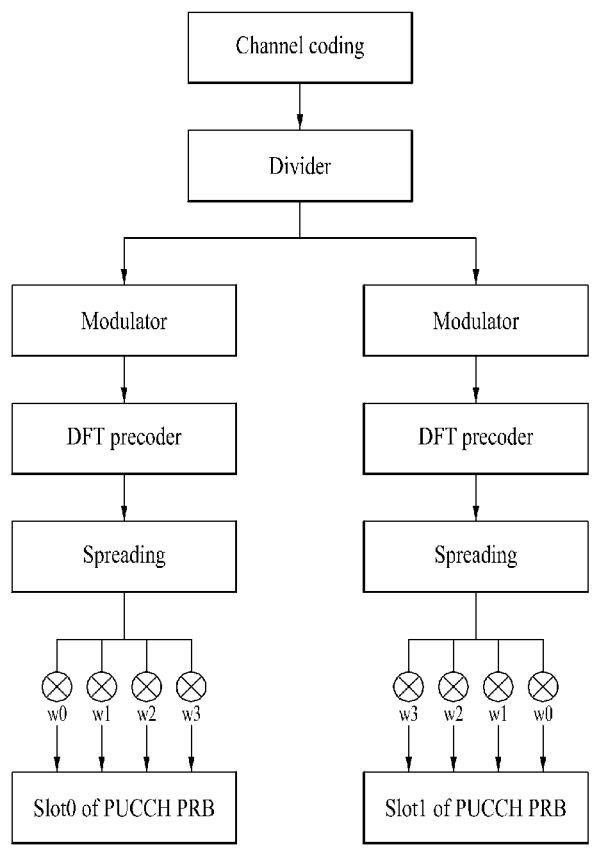

FIG. 30C is different from FIG. 30A in the order of the modulator and the divider. Accordingly, the signal processing procedure for the PUCCH format 3 may be performed in order of joint channel coding and division at a subframe level and modulation, DFT precoding and spreading at each slot level.

Figure 30D:
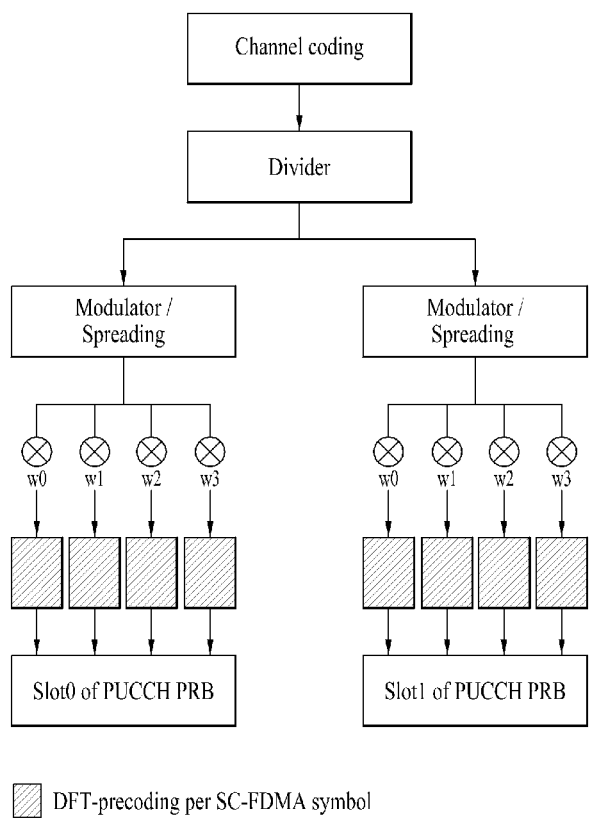

FIG. 30D is different from FIG. 30C in order of the DFT precoder and the spreading block. As described above, since the function of the spreading block is equal to multiplication of a DFT symbol sequence output from the DFT precoder by a specific constant at an SC-FDMA symbol level, the value of the signal mapped to the SC-FDMA symbols is identical even when the order of the DFT precoder and the spreading block is changed. Accordingly, the signal processing procedure for the PUCCH format 3 may be performed by joint channel coding and division at a subframe level and modulation at each slot level. The modulation symbol sequence generated in each slot is spread to a plurality of SC-FDMA symbols at the SC-FDMA symbol level and the modulation symbol sequence corresponding to each SC-FDMA symbol is DFT-precoded in SC-FDMA symbol units. In this case, the modulation process and the spreading process may be performed by one functional block. For example, the generated modulation symbols may be directly spread at the SC-FDMA symbol level while the encoded bits are modulated. As another example, the modulation symbols are copied to suit the size of the spreading code when the encoded bits are modulated, and the modulation symbols and the elements of the spreading code may be multiplied in one-to-one correspondence.

Figure 30E:
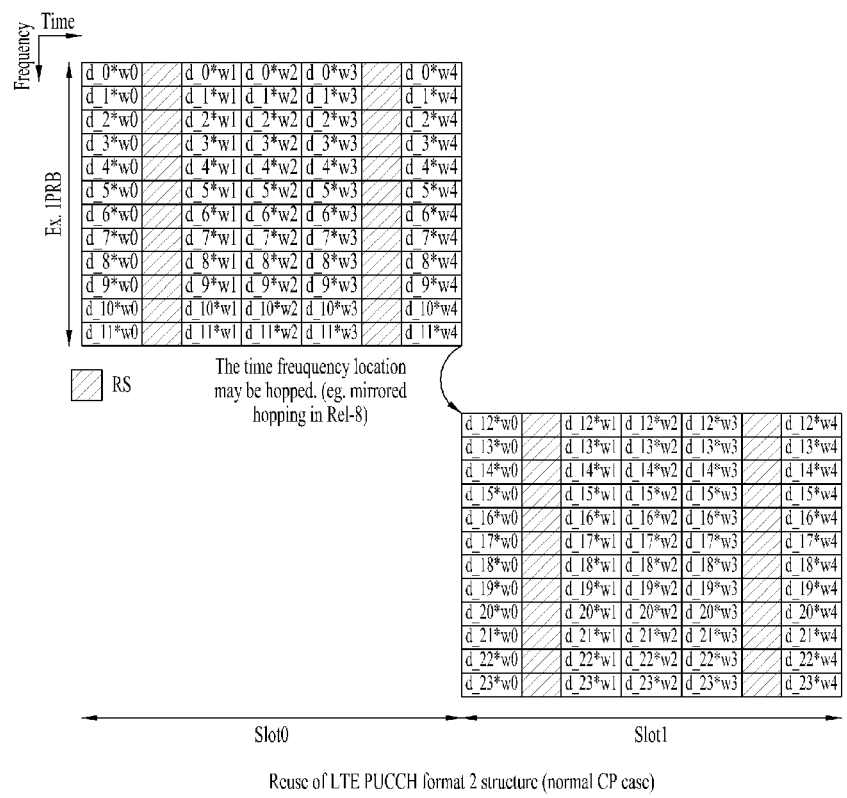
Figure 30F:
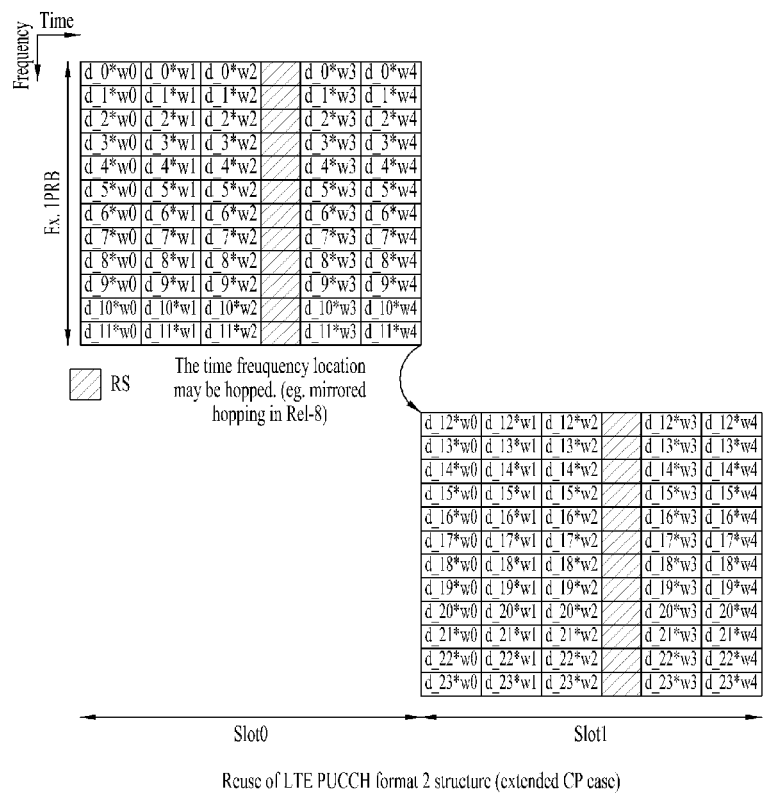

FIG. 30E shows the case where the PUCCH format 3 according to the present embodiment is applied to the structure of the PUCCH format 2 (normal CP) and FIG. 30F shows the case where the PUCCH format 3 according to the present embodiment is applied to the structure of the PUCCH format 2 (extended CP). The basic signal processing procedure is equal to those described with respect to FIGS. 30A to 30D. As the structure of the PUCCH format 2 of the existing LTE is reused, the number/locations of UCI SC-FDMA symbols and RS SC-FDMA symbols in the PUCCH format 3 is different from that of FIG. 30A.

Table 14 shows the location of the RS SC-FDMA symbol in the PUCCH format 3. It is assumed that the number of SC-FDMA symbols in a slot is 7 (indexes 0 to 6) in the normal CP case and the number of SC-FDMA symbols in a slot is 6 (indexes 0 to 5) in the extended CP case.

TABLE 14

|  | SC-FDMA symbol location of RS | | |
| --- | --- | --- | --- |
|  | Normal CP | Extended CP | Note |
| PUCCH format 3 | 2, 3, 4 1, 5 | 2, 3 3 | PUCCH format 1 is reused PUCCH format 2 is reused |

Tables 15 to 16 show the spreading code according to the SF value. Table 15 shows a DFT code with SF=5 and SF=3. Table 16 shows a Walsh code with SF=4 and SF=2. The DFT code is an orthogonal code represented by $\overline{w}_m = [w_0\ w_1\ \ldots\ w_{k-1}]$, where $w_k = \exp(j2\pi km/SF)$. Here, k denotes the size of the DFT code or an SF value and m is 0, 1, ..., SF-1. The following tables show the case where m is used as an index for the orthogonal code.

TABLE 15

| | Orthogonal code $\overline{w}_m = [w_0\ w_1\ \ldots\ w_{k-1}]$ | |
| --- | --- | --- |
| Index m | SF = 5 | SF = 3 |
| 0 | [1 1 1 1 1] | [1 1 1] |
| 1 | $[1\ e^{j2\pi/5}\ e^{j4\pi/5}\ e^{j6\pi/5}\ e^{j8\pi/5}]$ | $[1\ e^{j2\pi/3}\ e^{j4\pi/3}]$ |
| 2 | $[1\ e^{j4\pi/5}\ e^{j8\pi/5}\ e^{j2\pi/5}\ e^{j6\pi/5}]$ | $[1\ e^{j4\pi/3}\ e^{j2\pi/3}]$ |
| 3 | $[1\ e^{j6\pi/5}\ e^{j2\pi/5}\ e^{j8\pi/5}\ e^{j4\pi/5}]$ | |
| 4 | $[1\ e^{j8\pi/5}\ e^{j6\pi/5}\ e^{j4\pi/5}\ e^{j2\pi/5}]$ | |

TABLE 16

| | Orthogonal code | |
| --- | --- | --- |
| Index m | SF = 4 | SF = 2 |
| 0 | [+1 +1 +1 +1] | [+1 +1] |
| 1 | [+1 −1 +1 −1] | [+1 −1] |
| 2 | [+1 +1 −1 −1] | |
| 3 | [+1 −1 −1 +1] | |

The code index m may be defined in advance or signaled from a BS. For example, the code index m may be implicitly linked with a CCE index (e.g., a lowest CCE index) configuring a PDCCH. The code index m may be estimated from a value designated through PDCCH or RRC signaling. The code index m may be independently given in subframe units, slot units, or units of a plurality of SC-FDMA symbols. Preferably, the code index m may be changed in subframe units, slot units, or units of a plurality of SC-FDMA symbols. That is, the code index m may be hopped in units of a predetermined duration.

The signal generated through the above process is mapped to subcarriers in a PRB, is subjected to IFFT, and is transformed into a time domain signal. The time domain signal is attached with CP and the generated SC-FDMA symbols are transmitted through a RF stage.

On the assumption that ACK/NACK for five DL CCs is transmitted, each procedure will be described in detail. In the case where each DL CC may transmit two PDSCHs, the number ACK/NACK bits may be 12 if a DTX state is included. In case of QPSK modulation and SF=4 time spreading, a coding block size (after rate-matching) may be 48 bits. The encoded bits may be modulated into 24 QPSK symbols and 12 symbols of the generated QPSK symbols are divided to each slot. In each slot, 12 QPSK symbols are converted into 12 DFT symbols by a 12-point DFT operation. In each slot, 12 DFT symbols are spread to four SC-FDMA symbols using the spreading code having SF=4 in a time domain and are mapped. Since 12 bits are transmitted through [2 bits*12 subcarriers+8 SC-FDMA symbols], the coding rate is 0.0625 (=12/192). In case of SF=4, a maximum of eight UEs may be multiplexed per 1 PRB.

Although not shown, for inter-cell interference randomization, cell-specific scrambling using a scramble code (e.g., a PN code such as a gold code) corresponding to a physical cell ID (PCI) and UE-specific scrambling using a scramble code corresponding to a UE-ID (e.g., RNTI) may be additionally applied. Scrambling may be performed with respect to all information or may be performed in an SC-FDMA symbol and/or between SC-FDMA symbols. Scrambling of all information may be implemented by performing scrambling at an information bit level, a coding bit level or a modulation symbol level before division. Scrambling in the SC-FDMA symbol (intra-SC-FDMA symbol scrambling) may be implemented by performing scrambling at a modulation symbol level or a DFT symbol level after division. Scrambling between SC-FDMA symbols (inter-SC-FDMA symbol scrambling) may be implemented by performing scrambling at an SC-FDMA symbol level in a time domain after spreading.

CDM may be provided to a previous stage of the DFT precoder so as to multiplex UEs. For example, since a time domain signal is generated in the previous stage of the DFT predecoder, CDM may be implemented through circular shift (or cyclic shift) or Walsh (or DFT) spreading. CDM may be performed at any one of an information bit level, a coding bit level and a modulation symbol level. More specifically, the case where two UEs are multiplexed in one SC-FDMA symbol with a Walsh code with SF=2 is described. In the case where the number of coding bits is 12, when QPSK modulation is performed, complex signals $a_0\ a_1\ a_2\ a_3\ a_4\ a_5$ are generated. An example of spreading control information of each UE to a Walsh code of [+1 +1] [+1 −1] is as follows.

UE#0: [+1 +1] is applied. $a_0\ a_1\ a_2\ a_3\ a_4\ a_5\ a_0\ a_1\ a_2\ a_3\ a_4\ a_5$ are transmitted UE#1: [+1 −1] is applied. $a_0\ a_1\ a_2\ a_3\ a_4\ a_5\ -a_0\ -a_1\ -a_2\ -a_3\ -a_4\ -a_5$ are transmitted In this case, interleaving may be additionally performed. Interleaving may be applied before or after spreading. An example of applying both spreading and interleaving is as follows.

UE#0: [+1 +1] is applied. $a_0\ a_0\ a_1\ a_1\ a_2\ a_2\ a_3\ a_3\ a_4\ a_4\ a_5\ a_5$ are transmitted UE#1: [+1 −1] is applied. $a_0, -a_0, a_1, -a_1, a_2, -a_2, a_3, -a_3, a_4, -a_4, a_5, -a_5$ are transmitted The signal generated after spreading and/or interleaving in the previous stage of the DFT precoder is DFT-precoded (additionally subjected to time spreading at an SC-FDMA symbol level) and is then mapped to subcarriers of the SC-FDMA symbol.

Figure 31:
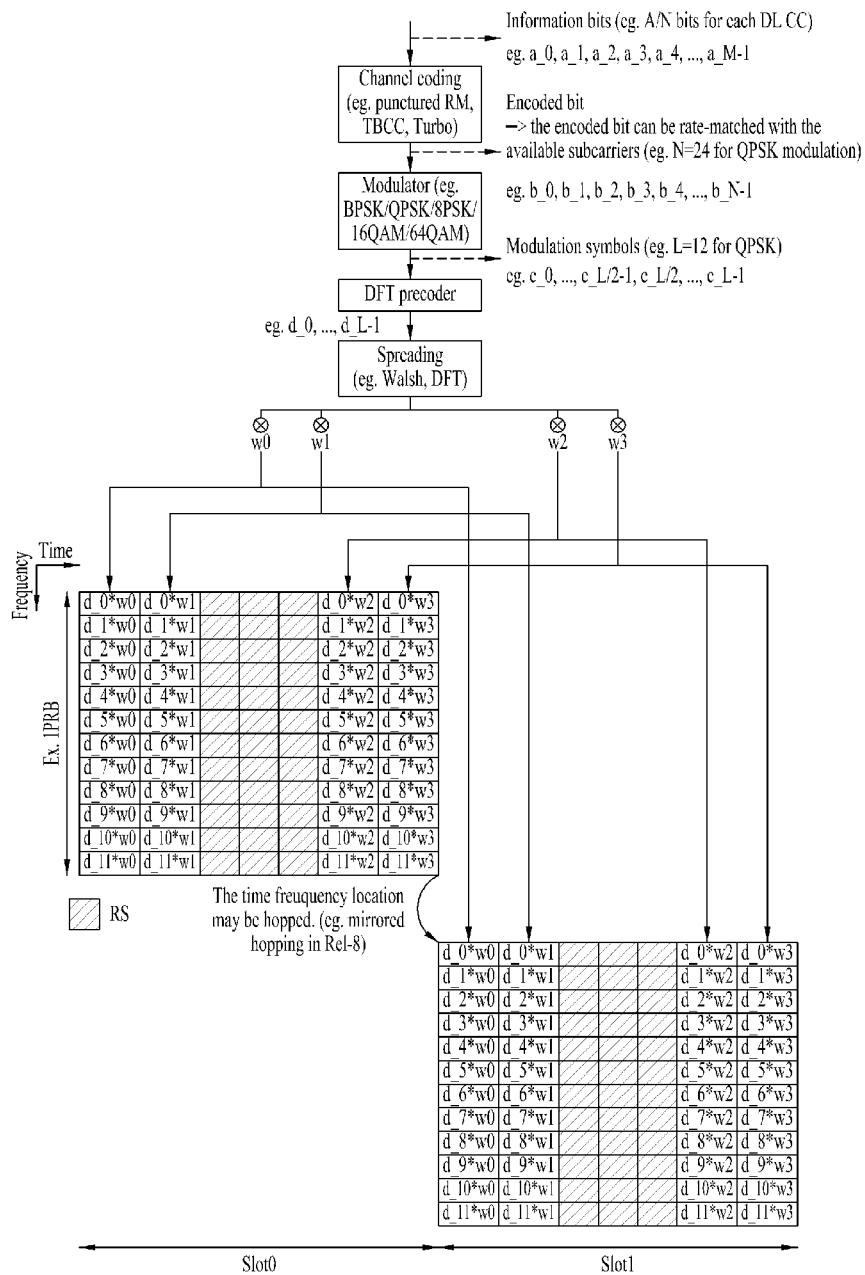

FIG. 31 shows another structure of the PUCCH format according to the present embodiment. The structure of the present PUCCH format is basically equal to the structure shown in FIG. 30. However, while a spreading code (e.g., a DFT orthogonal code or a Walsh code) having a length of 4 is used in FIG. 30, a spreading code having a length of 5 is used in FIG. 31. The numbers/locations of SC-FDMA symbols for control information and SC-FDMA symbols for the RS are different. Here, the RS follows the structure of the LTE. For example, in the RS, cyclic shift may be applied to base sequence.

Referring to FIG. 31, a multiplexing capacity of a control information section is 5 due to SF=5. A multiplexing capacity of an RS section is determined according to a cyclic shift interval $\Delta_{shift}^{PUCCH}$. More specifically, the multiplexing capacity of the RS section is $$\frac{12}{\Delta_{shift}^{PUCCH}}.$$

For example, multiplexing capacities are 12, 6 and 4 in case of $\Delta_{shift}^{PUCCH}=1$, $\Delta_{shift}^{PUCCH}=2$ and $\Delta_{shift}^{PUCCH}=3$, respectively.

In FIG. 31, the multiplexing capacity of the control information section is 5 due to SF=5 and the multiplexing capacity of the RS is 4 in case of $\Delta_{shift}^{PUCCH}=3$. Thus, the total multiplexing capacity is set to 4 which is the smaller capacity of the two multiplexing capacities.

Accordingly, the above-described SC-FDMA symbol level spreading may be applied to the RS so as to increase the total multiplexing capacity. For example, in FIG. 31, if a Walsh cover (or a DFT code cover) with a length of 2 is applied to a slot, the multiplexing capacity doubles. That is, even in case of $\Delta_{shift}^{PUCCH}=3$, the multiplexing capacity is 8 and the multiplexing capacity of the control information section is not lost.

Figure 32:
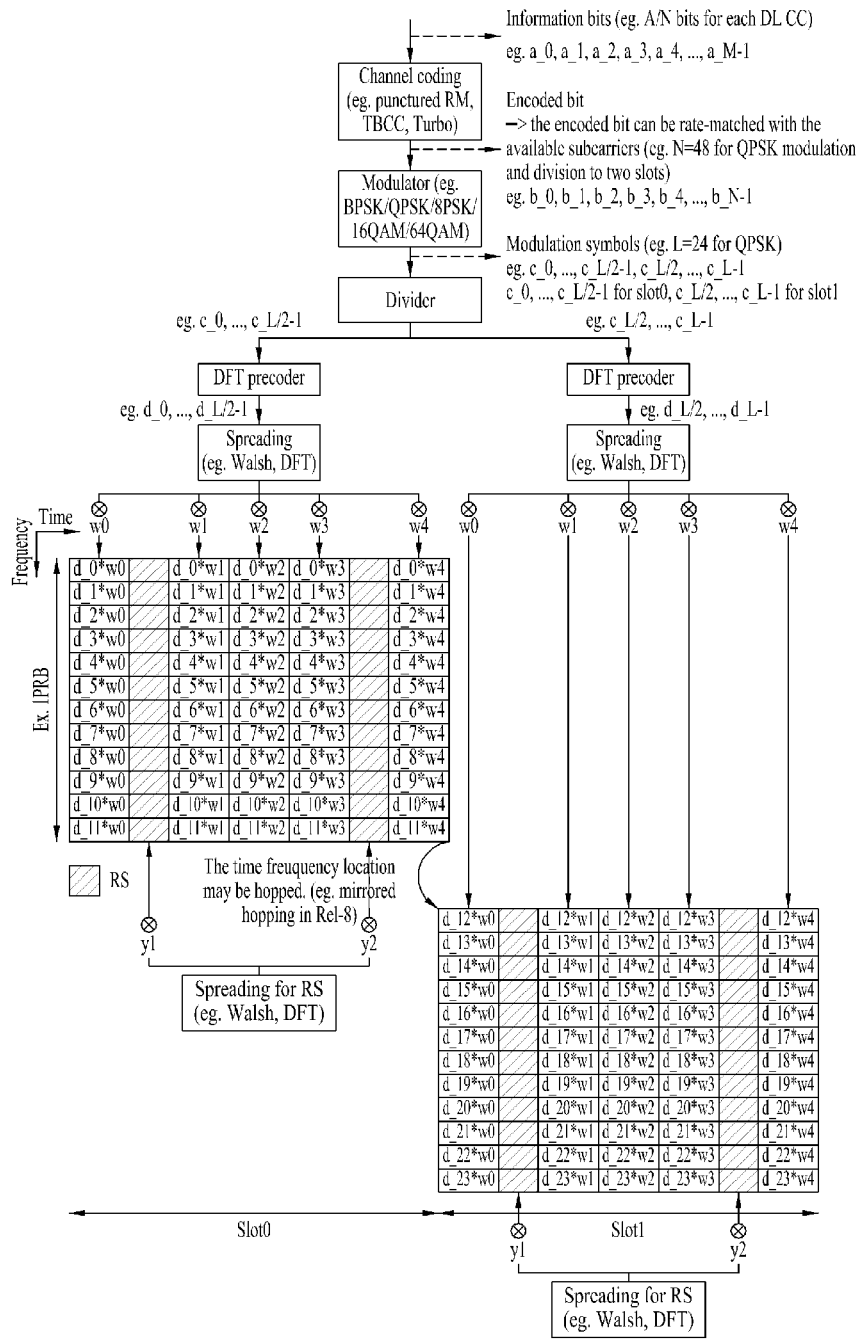
FIGS. 32 to 33 are diagrams showing a PUCCH format with an increased RS multiplexing capacity and a signal processing procedure according to an embodiment of the present invention.

FIG. 32 shows a PUCCH structure with an increased multiplexing capacity according to the present embodiment. Referring to FIG. 32, SC-FDMA symbol level spreading is applied to a slot in the RS section. Thus, the multiplexing capacity of the RS section doubles. The orthogonal code cover for the RS includes, but is not limited to, a Walsh cover of [y1 y2]=[1 1], [1 −1] or a linearly transformed form (e.g., [j j][j −j][1 j][1 −j], etc.) thereof y1 is applied to a first RS SC-FDMA symbol in the slot and y2 is applied to a second SC-FDMA symbol in the slot.

Figure 33:
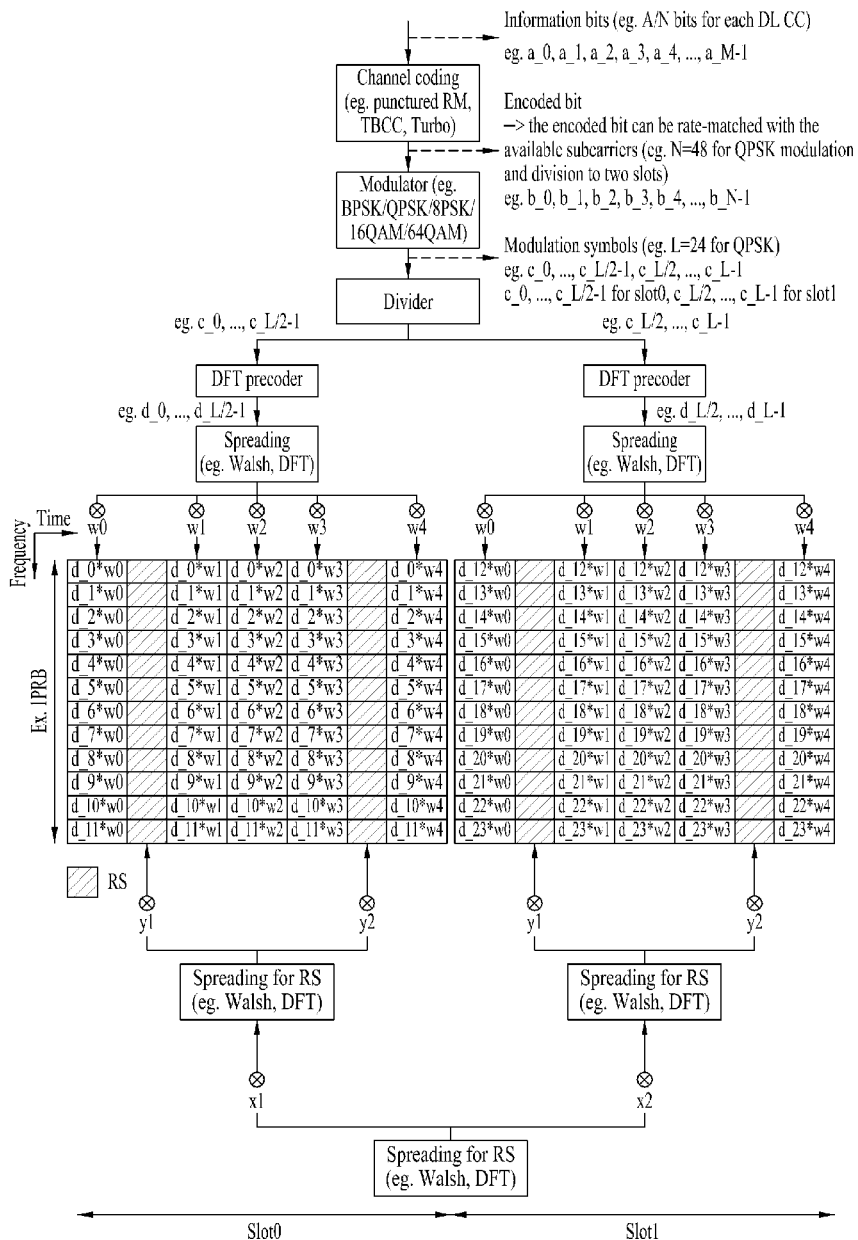

FIG. 33 shows another PUCCH structure with an increased multiplexing capacity. If slot-level frequency hopping is not performed, spreading or covering (e.g., Walsh covering) may be additionally performed in slot units so as to double the multiplexing capacity. In the case where slot-level frequency hopping is performed, if Walsh covering is applied in slot units, orthogonality may be broken due to a difference between channel conditions of slots. The slot unit spreading code (e.g., orthogonal code cover) for the RS includes, but is not limited to, a Walsh cover of [x1 x2]=[1 1], [1 −1] or a linearly transformed form (e.g., [j j][j −j][1 j][1 −j], etc.) thereof x1 is applied to a first slot and x2 is applied to a second slot. Although the case where slot-level spreading (or covering) is performed and spreading (or covering) is then performed at an SC-FDMA symbol level is shown in the drawing, the order may be changed.

The increased multiplexing capacity of the RS may be used for channel estimation of each antenna for a transmit diversity scheme. Hereinafter, Spatial Orthogonal Resource Transmit Diversity (SORTD) and SFBC of the transmit diversity will be described.

First, although a 2 Tx transmit diversity scheme according to the SORTD is described, the following examples may be equally/similarly extended even in an n-Tx transmit diversity scheme. For convenience, (quasi-)orthogonal resource for control information transmission is referred to as resource A and (quasi-)orthogonal resource for RS transmission is referred to as resource B. The logical indexes of the resources A and the resources B may be linked with each other. For example, if the logic index of the resource B is given, the logic index of the resource A may be automatically given. The physical configuration methods of the logical indexes of the resource A and the resource B may be different from each other. Two physical configuration methods are present.

1) The control information may be transmitted through the same PRB in all antennas (ports).

A. The control information may be transmitted through two difference resources A (e.g., an orthogonal code, a subcarrier shift (offset, or index) according to a frequency factor or a combination thereof) selected for each antenna (port). For example, the orthogonal code includes a Walsh code and a DFT code. The frequency factor may be $N_{sc}/N_{freq}$ or a reciprocal thereof. $N_{sc}$ denotes the number of subcarriers in a PRB and $N_{freq}$ denotes the number of subcarriers used to transmit control information in a PRB.

B. The RS may be transmitted through two different resources B (e.g., a combination of a cyclic shift and a DFT cover) selected in each antenna (port).

2) The control information may be transmitted through different PRBs in each antenna. For example, the control information may be transmitted through PRB#4 in an antenna (port) 0 and through PRB#6 in an antenna (port) 1.

A. The resources are not specially limited between control information transmitted through different antennas (ports) (That is, the resources may be different or identical).

B. The resources are not specially limited between RSs transmitted through different antennas (ports) (That is, the resources may be different or identical).

In a multi-antenna transmission (e.g., 2 Tx transmission) mode, two resources A for control information transmission and two resources B for RS transmission may be defined in advance or may be given through physical control channel (e.g., PDCCH) or RRC signaling. In this case, signaling for the control information and the RS may be individually performed. In addition, when resource information for any one antenna (port) is signaled, resource information for another antenna (port) may be calculated using the previously signaled resource information. For example, the code index m and/or a subcarrier position (e.g., shift, offset or index) according to the frequency factor may be defined in advance or signaled from a BS. As another example, the code index m and/or a subcarrier position (e.g., shift, offset or index) according to the frequency factor may be implicitly linked with a CCE index configuring a PDCCH. As another example, the code index m and/or a subcarrier position (e.g., shift, offset or index) according to the frequency factor may be explicitly designated through PDCCH or RRC signaling. The code index m and/or a subcarrier position (e.g., shift, offset or index) according to the frequency factor may be changed in subframe units, slot units or units of a plurality of SC-FDMA symbols. That is, the code index m and/or a subcarrier position (e.g., shift, offset or index) according to the frequency factor may be hopped in predetermined duration units (e.g., slot).

Figure 34:
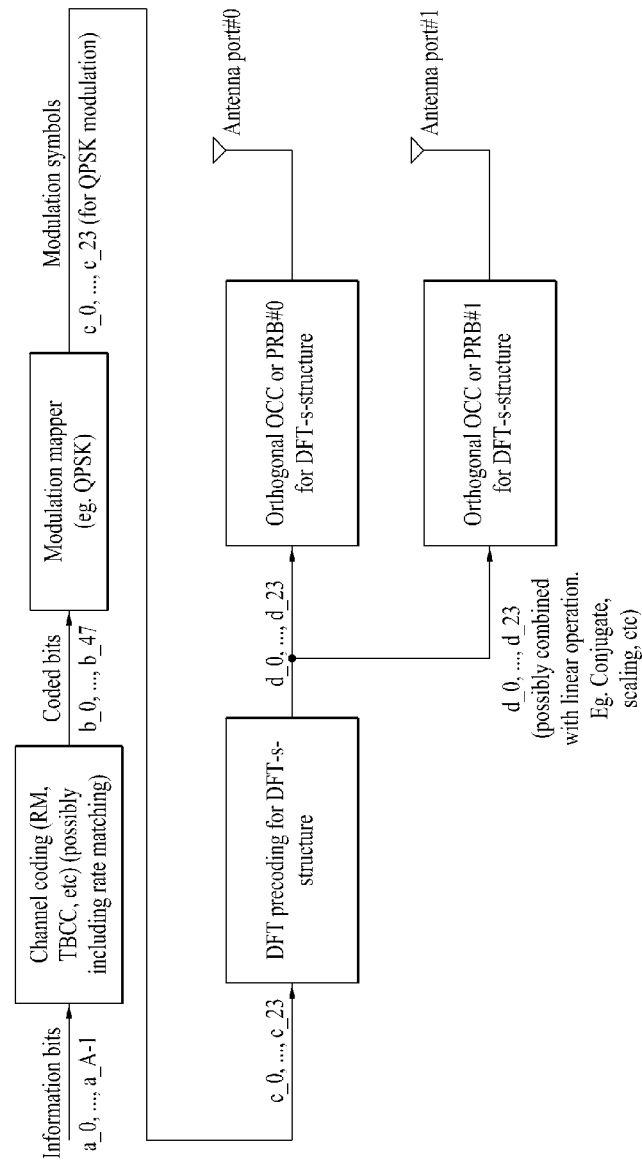
FIG. 34 is a diagram showing a signal processing block for transmitting a PUCCH through multiple antennas according to an embodiment of the present invention.

FIG. 34 shows a signal processing block/procedure for SORTD. The basic procedure excluding a multi-antenna transmission process is equal to those described with reference to FIGS. 30 to 33. Referring to FIG. 34, modulation symbols c_0, . . . , and c_23 are DFT-precoded and are then transmitted through resources (e.g., OC, PRB, or a combination thereof) of each antenna port. In this example, although one DFT operation is performed for a plurality of antenna ports, the DFT operation may be performed for each antenna port. Although the case where the DFT-precoded symbols d_0, . . . , and d_23 are copied and transmitted through a second OC/PRB is described, a modified form (e.g., complex conjugate or scaling) of the DFT-precoded symbols d_0, . . . , and d_23 may be transmitted through a second OC/PRB.

Hereinafter, an SORTD signal processing procedure will be described in greater detail using equations. First, as shown, the case where signal processing is performed in order of modulation, DFT precoding and time domain spreading will be described.

Equation 10 shows a procedure of DFT-precoding the modulation symbols. It is assumed that the number of modulation symbols is 24, which are divided to each slot by 12 modulation symbols.

$$d(n \cdot N_{sc} + k) = \frac{1}{\sqrt{N_{sc}}} \sum_{i=0}^{N_{sc}-1} c(i) e^{-j\frac{2\pi i k}{N_{sc}}} \quad \text{Equation 10}$$

$$k = 0, \cdots, N_{sc} - 1$$

$$n = 0, 1$$

where, d( ) denotes a DFT-precoded modulation symbol sequence and c( ) denotes a modulation symbol sequence. $N_{sc}$ denotes the number of subcarriers in a PRB.

Equation 11 shows a procedure of spreading the DFT-precoded modulation symbol sequence so as to be corresponding to a plurality of SC-FDMA symbols in a PUCCH.

$$z_l^{(p)}(\ ) = w_{oc0}(l)^{(p)} \times d(n) \ 0 <= n < 12$$

$$z_m^{(p)}(\ ) = w_{oc1}(m)^{(p)} \times d(n) \ 12 < n <= 23 \quad \text{Equation 11}$$

where, z( ) denotes spread modulation symbol sequences corresponding to SC-FDMA symbols for control information, and p denotes an antenna port. $w_{oc0}$ denotes an orthogonal code applied to a slot 0 and $w_{oc1}$ denotes an orthogonal code applied to a slot 1. 1 denotes 0, . . . , the number of SC-FDMA symbols for control information, which are located in the slot 0, −1. m denotes 0, . . . , the number of SC-FDMA symbols for control information, which are located in the slot 1, −1.

In case of 2 Tx SORTD, $z^{(0)}(\ )$ is transmitted through $PRB^{(0)}$ using an antenna port 0 and $z^{(1)}(\ )$ is transmitted through $PRB^{(0)}$ using an antenna port 1. In order to guarantee orthogonality between PUCCHs transmitted through different antenna ports, $[woc^{(0)} \neq woc^{(1)}; PRB^{(0)} = PRB^{(1)}]$, $[woc^{(0)} = woc^{(1)}; PRB^{(0)} \neq PRB^{(1)}]$ and $[woc^{(0)} \neq woc^{(1)}; PRB^{(0)} \neq PRB^{(1)}]$ are possible.

Next, the case where signal processing is performed in order of modulation, time domain spreading and DFT precoding will be described. It is assumed that the number of modulation symbols is 24, which are divided to each slot by 12 modulation symbols.

Equation 12 shows a procedure of spreading a modulation symbol sequence so as to be corresponding to a plurality of SC-FDMA symbols in a PUCCH.

$$y_l^{(p)}(\ ) = w_{oc0}(l)^{(p)} \times c(n) \ 0 <= n < 12$$

$$y_m^{(p)}(\ ) = w_{oc1}(m)^{(p)} \times c(n) \ 12 < n <= 23 \quad \text{Equation 12}$$

where, y( ) denotes modulation symbol sequences spread so as to be corresponding to the plurality of SC-FDMA symbols for control information in the slot of the PUCCH, and p denotes an antenna port. c( ) denotes a modulation symbol sequence. $w_{oc0}$ denotes an orthogonal code applied to a slot 0 and $w_{oc1}$ denotes an orthogonal code applied to a slot 1. 1 denotes 0, . . . , the number of SC-FDMA symbols ($N_{SF,0}$) for control information, which are located in the slot 0, −1. m denotes 0, . . . , the number of SC-FDMA symbols ($N_{SF,1}$) for control information, which are located in the slot 1, −1.

Equation 13 shows a procedure of DFT-precoding the spread modulation symbols.

$$d(n \cdot N_{sc} + k)^{(p)} = \frac{1}{\sqrt{N_{sc}}} \sum_{i=0}^{N_{sc}-1} y_n(i)^{(p)} e^{-j\frac{2\pi i k}{N_{sc}}} \quad \text{Equation 13}$$

$$k = 0, \cdots, N_{sc} - 1$$

$$n = 0, \cdots, N_{SF} - 1$$

where, d( ) denotes a DFT-precoded modulation symbol sequence and y( ) denotes a modulation symbol sequence spread so as to be corresponding to the SC-FDMA symbols for control information. p denotes an antenna port. $N_{sc}$ denotes the number of subcarriers in a PRB. $N_{SF}$ denotes the number of SC-FDMA symbols for control information in a subframe.

In case of 2 Tx SORTD, $d^{(0)}(\ )$ is transmitted through $PRB^{(0)}$ using an antenna port 0 and $d^{(1)}(\ )$ is transmitted through $PRB^{(0)}$ using an antenna port 1. In order to guarantee orthogonality between PUCCHs transmitted through different antenna ports, $[woc^{(0)} \neq woc^{(1)}; PRB^{(0)} = PRB^{(1)}]$, $[woc^{(0)} = woc^{(1)}; PRB^{(0)} \neq PRB^{(1)}]$ and $[woc^{(0)} \neq woc^{(1)}; PRB^{(0)} \neq PRB^{(1)}]$ are possible.

Figure 35A:
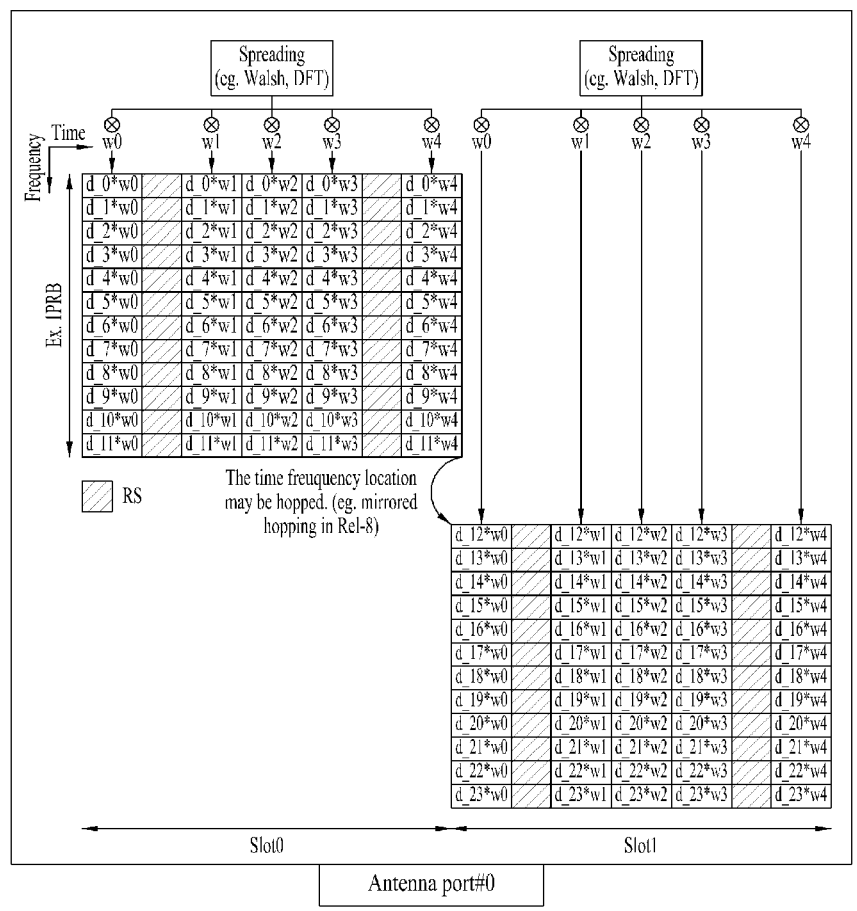
FIGS. 35A to 35B are diagrams showing a PUCCH generated in each antenna port in FIG. 34.
Figure 35B:
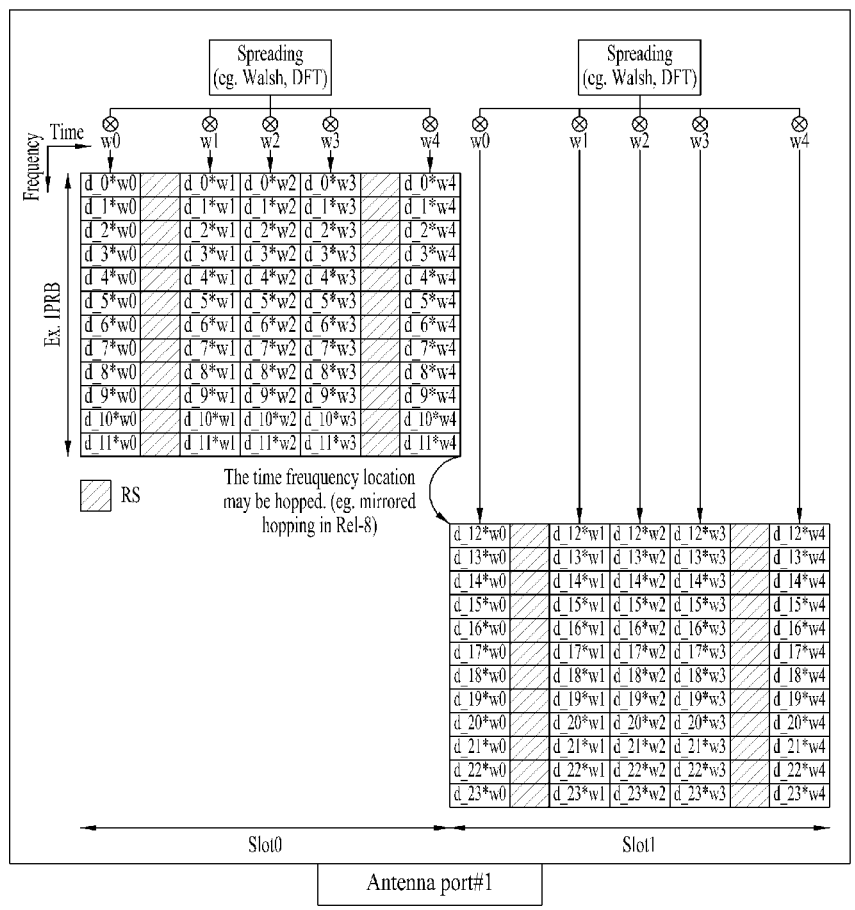

An example of the antenna (port) 0 in the case where the SORTD of FIG. 34 is applied is shown in FIG. 35A and an example of the antenna port (1) is shown in FIG. 35B. Referring to FIGS. 35A and 35B, resources (e.g., a combination of an orthogonal code and a PRB) used to transmit the PUCCH are different between antennas (ports) (e.g., resource #0 for antenna 0 and resource #1 for antenna 1). The signals transmitted through the antenna (port) 0 and the antenna (port) 1 may be equal to each other or may be modified by a predetermined rule.

Figure 36:
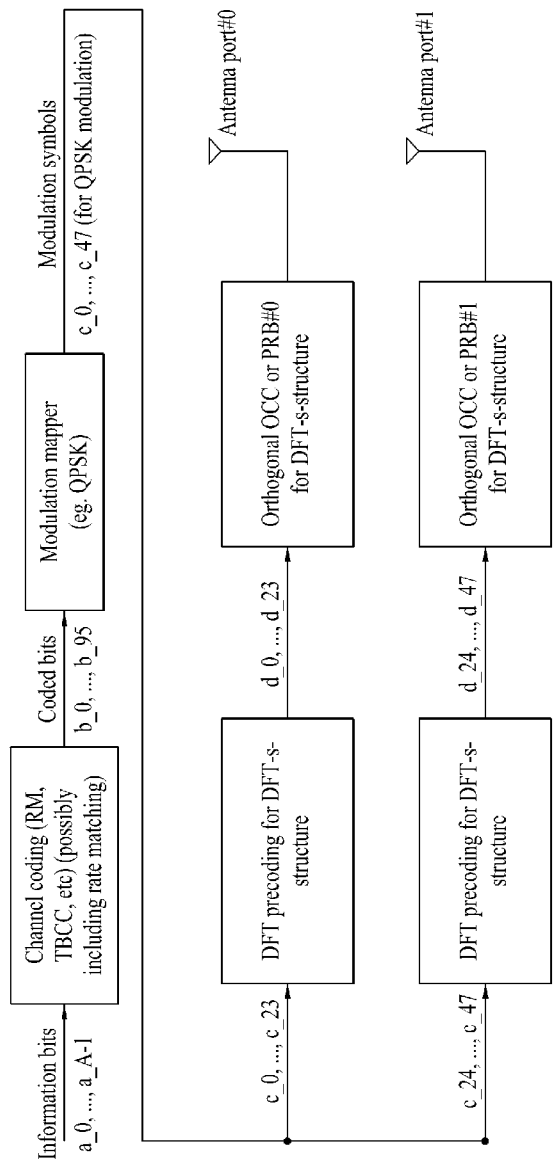
FIGS. 36 and 37 are diagrams showing a signal processing block for transmitting a PUCCH through multiple antennas according to other embodiments of the present invention.

FIG. 36 shows another example of a signal processing block/procedure for SORTD. This example is a method of performing joint coding with respect to control information, distributing and mapping the coded control information to multiple resources and obtaining space-coding gain. Referring to FIG. 30 again, in 1 Tx transmission, 48 encoded bits are generated, are subjected to QPSK modulation, and are mapped to 24 subcarriers over two slots. According to the Tx diversity method of this example, if two orthogonal resources are used, 96 (=48*2) coded bits may be uniformly distributed to orthogonal resources and the orthogonal resources may be mapped to the transmission antennas (ports) so as to be transmitted. The basic procedure excluding the multi-antenna transmission process of FIG. 36 is equal to those described with reference to FIGS. 30 to 33.

Referring to FIG. 36, the modulation symbols c_0, ..., and c_47 are divided on a per antenna port basis. For example, the modulation symbols c_0, ..., and c_23 may be divided to the antenna port 0 and the modulation symbols c_24, ..., and c_47 may be divided to the antenna port 1. The modulation symbols may be interleaved (or permutated) in the case of being divided to the antenna ports. For example, the even-numbered modulation symbols may be divided to the antenna port 0 and the odd-numbered modulation symbols may be divided to the antenna port 1. Thereafter, the modulation symbol sequence is DFT-precoded on a per antenna port basis and is then transmitted using resources (e.g., OCC (or OC), PRB or a combination thereof) provided to each antenna port. Although the case where QPSK modulation symbols input to the resource (allocation) blocks of the antenna ports are c_0, ..., and c_23 (for orthogonal resource 0) and c_24, ..., and c_47 (for orthogonal resource 1) is shown in FIG. 36, this example may be applied to an interleaving pattern of the QPSK modulation symbols. For example, this example may be applied to an interleaving pattern of c_0, c_2, ..., and c_46 (for orthogonal resource 0) and c_1, c_3, ..., and c47 (for orthogonal resource 1).

Figure 37:
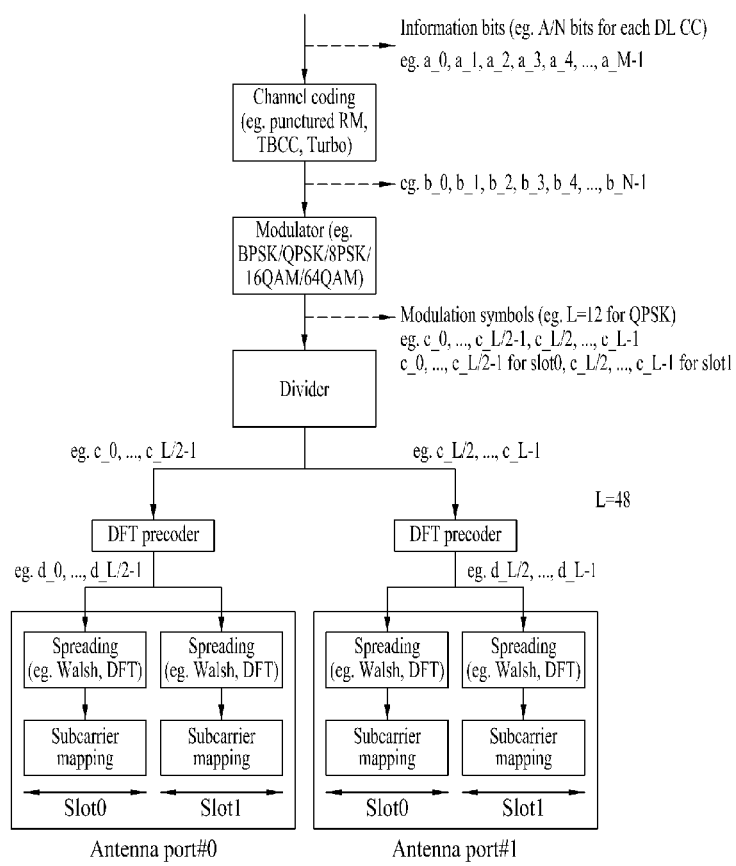
Figure 38A:
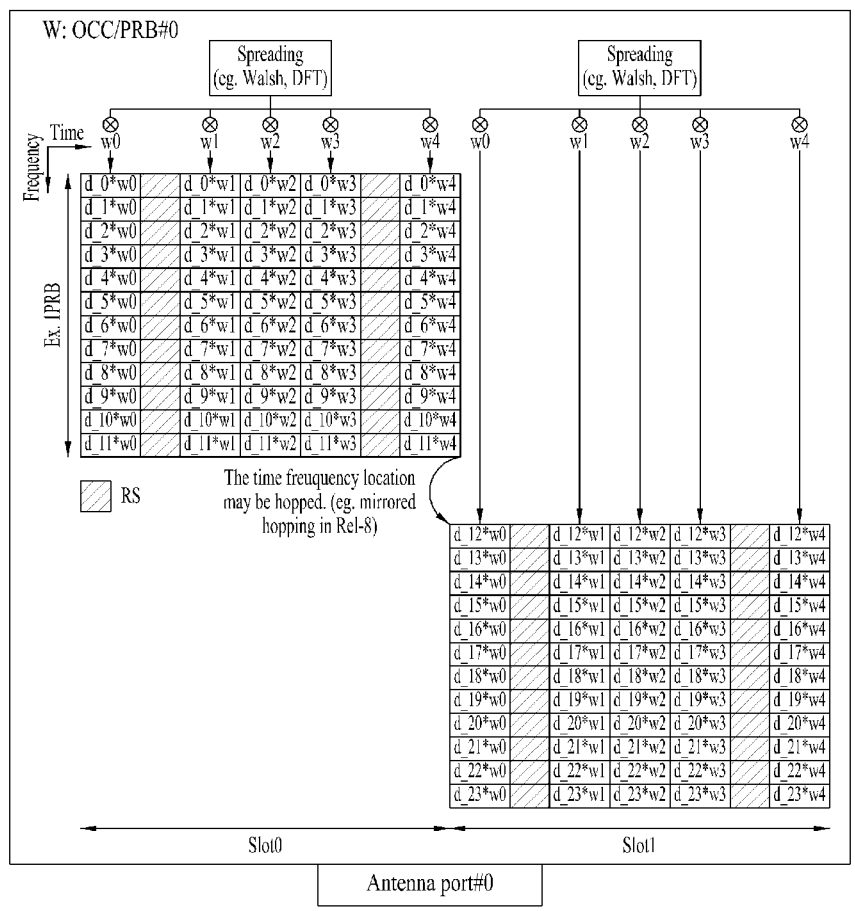
FIGS. 38A to 38B are diagrams showing a PUCCH generated in each antenna port in FIGS. 36 and 37.
Figure 38B:
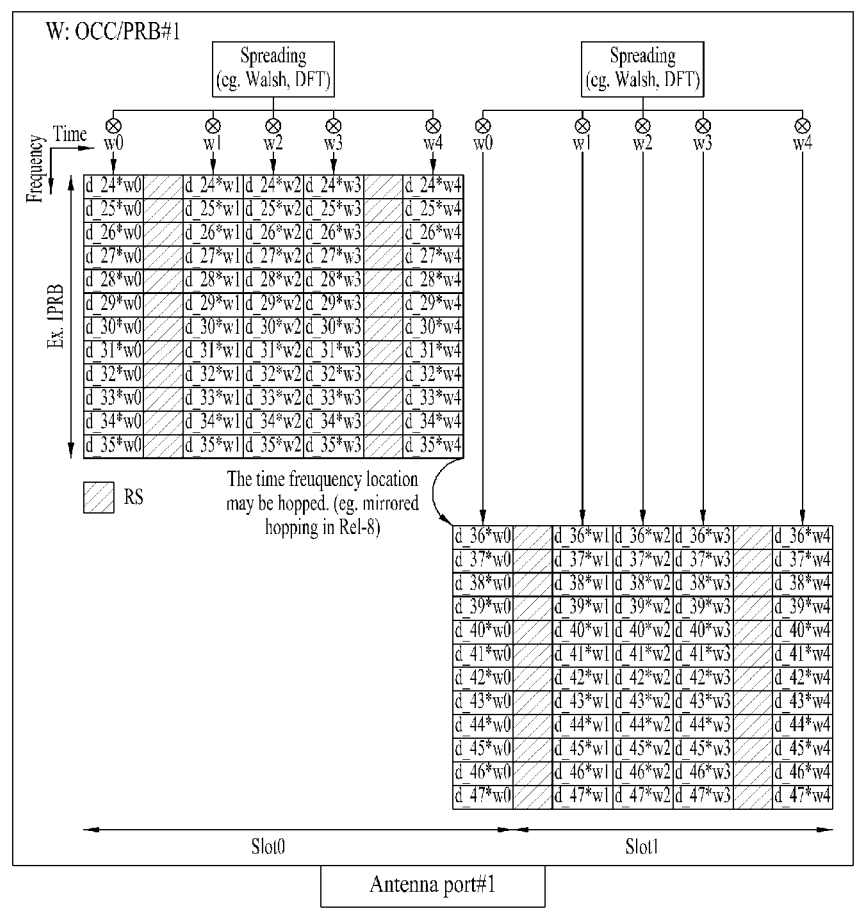

FIG. 37 shows another example of the signal processing block/procedure of FIG. 36. The basic procedure is equal to those described with reference to FIGS. 30 to 33 and 36. FIG. 38A shows a PUCCH structure for an antenna port 0 and FIG. 38B shows a PUCCH structure for an antenna port 1. Referring to FIGS. 38A and 38B, a signal for the antenna port 0 is transmitted through a PRB #0 and a signal for the antenna port 1 is transmitted through a PRB #1. In this case, since the PUCCH is transmitted through PRBs which are different between antenna ports, a spreading code (or an orthogonal code cover (OCC or OC)) for control information, a cyclic shift or spreading code (or orthogonal code cover (OCC or OC)) for RS, etc. may be the same in the antenna ports 0 and 1.

If the multiplexing order of the RS part is greater than or equal to twice the multiplexing order of the control information part, the following 2 Tx transmission diversity scheme is applicable. At this time, two resources of resources (CS+OC+PRB) of the RS part may be used for channel estimation of two transmission antennas and only one resource (subcarrier position+OC+PRB) may be used in the control information section.

Figure 39:
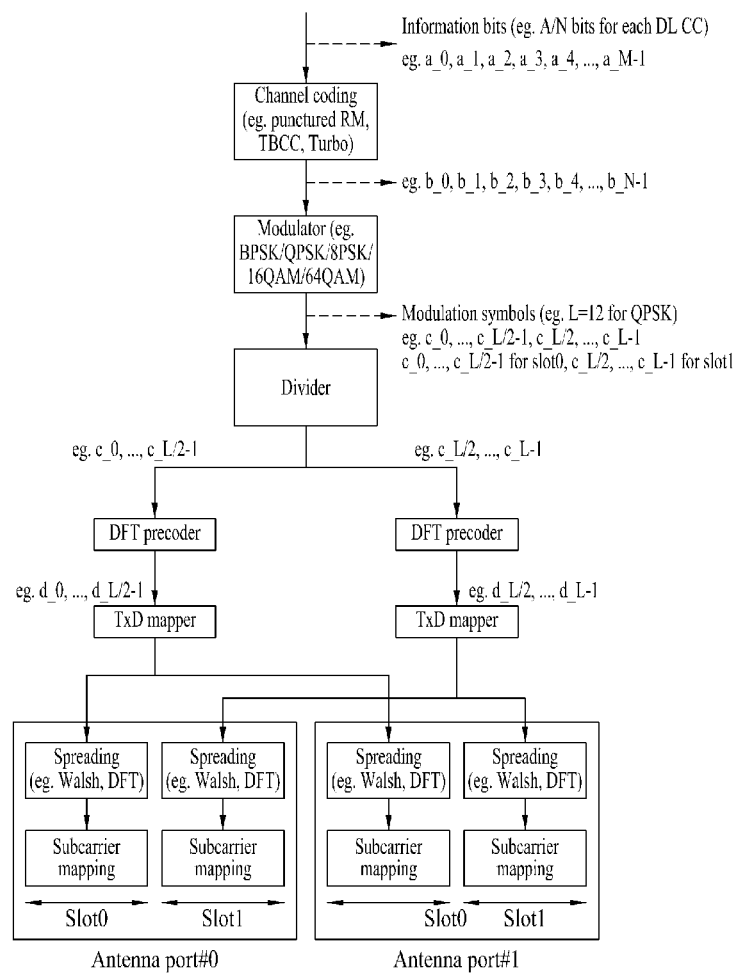
FIG. 39 is a diagram showing a signal processing procedure for transmitting a PUCCH through multiple antennas according to another embodiment of the present invention.
Figure 40:
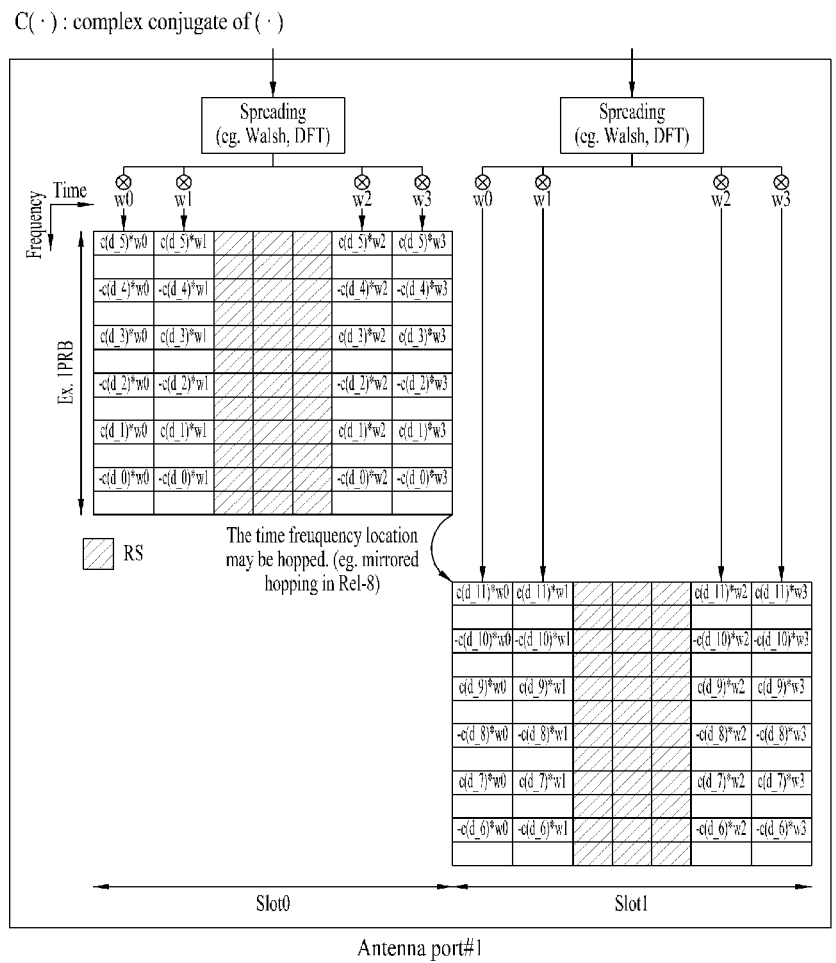
FIG. 40 is a diagram showing a PUCCH generated for an antenna port 1 in FIG. 39.

FIG. 39 shows a signal processing procedure for transmitting control information through multiple antennas according to the present embodiment. FIG. 40 is an enlarged view of the PUCCH structure of the antenna port 1. The basic processing procedure is similar to those described with reference to FIGS. 30 to 33. Referring to FIG. 39, a Transmit Diversity (TxD) mapper distributes DFT precoder output values into the multiple antennas. Although not limited, the TxD mapper performs a process such as resource allocation/multiple input multiple output (MIMO) precoding/processing for transmitting the control information through the multiple antennas (ports).

For example, the TxD mapper may apply an Alamouti scheme to the output values of the DFT precoder in the frequency domain. The Alamouti scheme may be expressed by the following matrix.

$$\begin{pmatrix} s_1 & -s_2^* \\ s_2 & s_1^* \end{pmatrix} \qquad \text{Equation 14}$$

where, a column 0 and a column 1 respectively denote signal vectors transmitted through the antenna (port) 0 and the antenna (port) 1, and a row 0 and a row 1 respectively denote complex signal vectors transmitted through a first subcarrier and a second subcarrier. * denotes a complex conjugate operation. Any form linearly transformed from the above matrix is applicable to the present invention.

If the Alamouti scheme is simply applied to the PUCCH format according to the embodiment of the present invention, the order of DFT symbols mapped to the SC-FDMA symbols of the antenna (port) 1 are reversed in units of two DFT symbols. For example, d_0, d_1, d_2 and d_3 are mapped to the SC-FDMA symbols of the antenna (port) 0 and −d_1*, d_0*, −d_3*, d_2* are mapped to the SC-FDMA symbols of the antenna (port) 1. Thus, since the single carrier property of the signal mapped to the antenna (port) 1 is broken, the CM of the antenna (port) 1 is increased.

In order to solve this problem, the present embodiment further proposes a multi-antenna coding method which does not increase the CM even when the Alamouti scheme is applied. More specifically, when the control information is mapped to the antenna (port) 0, the complex signal is mapped to the subcarrier after DFT precoding. In contrast, when the control information is mapped to the antenna (port) 1, (1) the control information is mapped to subcarriers in the SC-FDMA symbols in reverse order, (2) a complex conjugate operation is performed, and (3) an alternative minus sign is attached. The order of (1) to (3) is exemplary and may be changed. The present method is applicable to the embodiments of the present invention. For example, if this method is applied to FIG. 30, a complex symbol sequence mapped to the SC-FDMA symbols of the first antenna (port) and the second antenna (port) are given as follows.

First antenna (port): $a_k$

Second antenna (port): $(-1)^{mod(k,2)} \cdot \text{conj}(a_{11-k})$ \qquad Equation 15 where, $a_k$ denotes a complex symbol sequence mapped to subcarriers of the SC-FDMA symbols, and k denotes a complex symbol index (0 to 11). mod(a,b) denotes a remainder obtained by dividing a by b. conj(a) denotes a complex conjugate value of a.

In Equation 16, it is assumed that all complex signals are mapped to subcarriers in the SC-FDMA symbols. If the complex signals are mapped to only some of the subcaerriers in the SC-FDMA symbols, Equation 11 may be generalized as follows.

First antenna (port): $a_k$

Second antenna (port): $(-1)^{mod(k,2)} \cdot \text{conj}(a_{n-k})$ or
$(-1)^{mod(k+1,2)} \cdot \text{conj}(a_{n-k})$ \qquad Equation 16 where, n denotes the length of the complex symbol sequence $a_k$ mapped to subcarriers in a SC-FDMA symbol −1 (e.g., $0 \leq n \leq 11$).

In addition, a complex symbol sequence mapped to the SC-FDMA symbol of the first antenna (port) or the second antenna (port) may be cyclically shifted (for example, shifted by a half the length of the complex symbol sequence) in a frequency direction. Tables 17 to 19 show the case where the Alamouti scheme is applied according to the present embodiment.

TABLE 17

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| Antenna (port) 1 | $-a_{11}^*$ | $a_{10}^*$ | $-a_9^*$ | $a_8^*$ | $-a_7^*$ | $a_6^*$ | $-a_5^*$ | $a_4^*$ | $-a_3^*$ | $a_2^*$ | $-a_1^*$ | $a_0^*$ |

TABLE 18

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| Antenna (port) 1 | $-a_5^*$ | $a_4^*$ | $-a_3^*$ | $a_2^*$ | $-a_1^*$ | $a_0^*$ | $-a_{11}^*$ | $a_{10}^*$ | $-a_9^*$ | $a_8^*$ | $-a_7^*$ | $a_6^*$ |

TABLE 19

| SC-FDMA symbol | Subcarrier index | | | | | |
|---|---|---|---|---|---|---|
| | 0 | 1 | 2 | 3 | 4 | 5 |
| Antenna (port) 0 | $a_0$ | $a_1$ | $a_2$ | $a_3$ | $a_4$ | $a_5$ |
| Antenna (port) 1 | $-a_5^*$ | $a_4^*$ | $-a_3^*$ | $a_2^*$ | $-a_1^*$ | $a_0^*$ |

In the above-described embodiments, the case where the control information is continuously mapped to the frequency domain (subcarriers) was mainly described. They are only exemplary and the control information may be mapped to the subcarriers in the SC-FDMA symbols in an interleaving method and a local method (that is, FDM mapping). FDM mapping may be used for UE multiplexing, antennas (ports) multiplexing, etc. For example, in the case where DFT symbols are mapped in the frequency domain, a maximum of 24 UEs may be multiplexed if a subcarrier interval is set to two to three, and 32/48 UEs may be multiplexed if a subcarrier interval is set to four/six. The above-described embodiments may be applied to CDM mapping using time/frequency domain cyclic shift.

Figure 41:
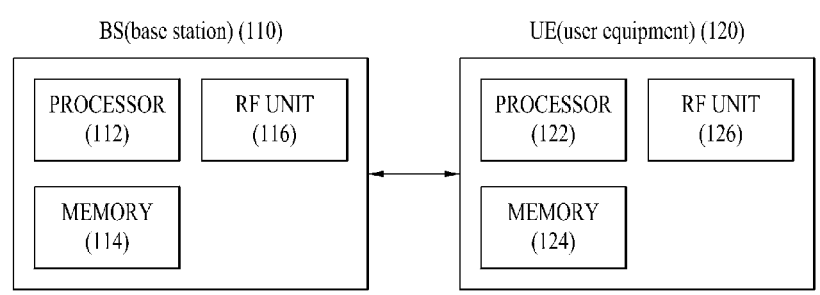
FIG. 41 is a diagram showing a BS and a UE applicable to the present invention.

FIG. 41 is a diagram showing a BS and a UE applicable to the present invention.

Referring to FIG. 41, a wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 so as to store a variety of information associated with the operation of the processor 112. The RF unit 116 is connected to the processor 112 so as to transmit and/or receive a RF signal. The UE 120 includes a processor 122, a memory 124 and a RF unit 126. The processor 122 may be configured to implement the procedures and/or methods proposed by the present invention. The memory 124 is connected to the processor 122 so as to store a variety of information associated with the operation of the processor 122. The RF unit 126 is connected to the processor 122 so as to transmit and/or receive a RF signal. The BS 110 and/or the UE 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applicable to a terminal, a BS or another device of a wireless mobile communication system. More specifically, the present invention is applicable to a method and apparatus for transmitting uplink control information.

What is claimed:

1. A method of transmitting a physical uplink control channel (PUCCH) signal at a user equipment (UE) in a wireless communication system, the method comprising:
   receiving a Radio Resource Control (RRC) signal including PUCCH resource information;
   spreading first $N_1/2$ modulation symbols of the $N_1$ modulation symbols by using a first orthogonal code to generate a first plurality of sequences, each sequence of the first plurality of sequences including the first $N_1/2$ modulation symbols, and $N_1$ being twice a number of subcarriers in one resource block (RB);
   spreading second $N_1/2$ modulation symbols of the $N_1$ modulation symbols by using a second orthogonal code to generate a second plurality of sequences, each sequence of the second plurality of sequences including the second $N_1/2$ modulation symbols;
   spreading the first $N_1/2$ modulation symbols of the $N_1$ modulation symbols by using a third orthogonal code to generate a third plurality of sequences, each sequence of the third plurality of sequences including the first $N_1/2$ modulation symbols;
   spreading the second $N_1/2$ modulation symbols of the $N_1$ modulation symbols by using a fourth orthogonal code to generate a fourth plurality of sequences, each sequence of the fourth plurality of sequences including the second $N_1/2$ modulation symbols;
   transmitting the first and third plurality of sequences in a first slot of a subframe through different antenna ports using the PUCCH resource information, each sequence of the first and third plurality of sequences mapped on a corresponding single carrier frequency division multiple access (SC-FDMA) symbol in the first slot; and
   transmitting the second and fourth plurality of sequences in a second slot of the subframe through different antenna ports using the PUCCH resource information, each sequence of the second and fourth plurality of sequences mapped on a corresponding SC-FDMA symbol in the second slot.

2. The method of claim 1, further comprising:
   performing a discrete Fourier transform of each sequence of the first plurality of sequences, the second plurality of sequences, the third plurality of sequences and the fourth plurality of sequences.

3. The method of claim 1, wherein:
   the first orthogonal code is different from the third orthogonal code; and
   the second orthogonal code is different from the fourth orthogonal code.

4. The method of claim 1, wherein:
   the first and third plurality of sequences are transmitted using different RBs in the first slot; and
   the second and fourth plurality of sequences are transmitted using different RBs in the second slot.

5. The method of claim 3, wherein:
   the first and third plurality of sequences are transmitted using a same RB in the first slot; and
   the second and fourth plurality of sequences are transmitted using a same RB in the second slot.

6. A user equipment configured to transmit a physical uplink control channel (PUCCH) signal in a wireless communication system, the user equipment comprising:
   a radio frequency (RF) unit configured for transmitting information; and
   a processor configured for:
   receiving a Radio Resource Control (RRC) signal including PUCCH resource information;
   spreading first $N_1/2$ modulation symbols of the $N_1$ modulation symbols by using a first orthogonal code to generate a first plurality of sequences, each sequence of the first plurality of sequences including the first $N_1/2$ modulation symbols, and $N_1$ being twice a number of subcarriers in one resource block (RB);
   spreading second $N_1/2$ modulation symbols of the $N_1$ modulation symbols by using a second orthogonal code to generate a second plurality of sequences, each sequence of the second plurality of sequences including the second $N_1/2$ modulation symbols;
   spreading the first $N_1/2$ modulation symbols of the $N_1$ modulation symbols by using a third orthogonal code to generate a third plurality of sequences, each sequence of the third plurality of sequences including the first $N_1/2$ modulation symbols;
   spreading the second $N_1/2$ modulation symbols of the $N_1$ modulation symbols by using a fourth orthogonal code to generate a fourth plurality of sequences, each sequence of the fourth plurality of sequences including the second $N_1/2$ modulation symbols;
   transmitting the first and third plurality of sequences in a first slot of a subframe through different antenna ports using the PUCCH resource information, each sequence of the first and third plurality of sequences mapped on a corresponding single carrier frequency division multiple access (SC-FDMA) symbol in the first slot; and
   transmitting the second and fourth plurality of sequences in a second slot of the subframe through different antenna ports using the PUCCH resource information, each sequence of the second and fourth plurality of sequences mapped on a corresponding SC-FDMA symbol in the second slot.

7. The user equipment of claim 6, wherein the processor is further configured for:
performing a discrete Fourier transform of each sequence of the first plurality of sequences, the second plurality of sequences, the third plurality of sequences and the fourth plurality of sequences is discrete Fourier transformed.

8. The user equipment of claim 6, wherein:
the first orthogonal code is different from the third orthogonal code; and
the second orthogonal code is different from the fourth orthogonal code.

9. The user equipment of claim 6, wherein:
the first and third plurality of sequences are transmitted using different RBs in the first slot; and
the second and fourth plurality of sequences are transmitted using different RBs in the second slot.

10. The user equipment of claim 8, wherein:
the first and third plurality of sequences are transmitted using a same RB in the first slot; and
the second and fourth plurality of sequences are transmitted using a same RB in the second slot.

11. A method of receiving a physical uplink control channel (PUCCH) signal at a base station (BS) in a wireless communication system, the method comprising:
transmitting a Radio Resource Control (RRC) signal including PUCCH resource information;
receiving a first and third plurality of sequences in a first slot of a subframe through different antenna ports using the PUCCH resource information, each sequence of the first and third plurality of sequences mapped on a corresponding single carrier frequency division multiple access (SC-FDMA) symbol in the first slot; and
receiving a second and fourth plurality of sequences in a second slot of the subframe through different antenna ports using the PUCCH resource information, each sequence of the second and fourth plurality of sequences mapped on a corresponding SC-FDMA symbol in the second slot,
wherein the first plurality of sequences are generated by spread of first $N_1/2$ modulation symbols of $N_1$ modulation symbols using a first orthogonal code, each sequence of the first plurality of sequences including the first $N_1/2$ modulation symbols, and $N_1$ being twice a number of subcarriers in one resource block (RB),
wherein the second plurality of sequences are generated by spread of second $N_1/2$ modulation symbols of the $N_1$ modulation symbols using a second orthogonal code, each sequence of the second plurality of sequences including the second $N_1/2$ modulation symbols,
wherein the third plurality of sequences are generated by spread of the first $N_1/2$ modulation symbols of the $N_1$ modulation symbols using a third orthogonal code, each sequence of the third plurality of sequences including the first $N_1/2$ modulation symbols,
wherein the fourth plurality of sequences are generated by spread of the second $N_1/2$ modulation symbols of the $N_1$ modulation symbols using a fourth orthogonal code, each sequence of the fourth plurality of sequences including the second $N_1/2$ modulation symbols.

12. The method of claim 11, wherein:
each sequence of the first plurality of sequences, the second plurality of sequences, the third plurality of sequences and the fourth plurality of sequences includes a discrete Fourier transformed sequence.

13. The method of claim 11, wherein:
the first orthogonal code is different from the third orthogonal code; and
the second orthogonal code is different from the fourth orthogonal code.

14. The method of claim 11, wherein:
the first and third plurality of sequences are received using different RBs in the first slot; and
the second and fourth plurality of sequences are received using different RBs in the second slot.

15. The method of claim 13, wherein:
the first and third plurality of sequences are received using a same RB in the first slot; and
the second and fourth plurality of sequences are received using a same RB in the second slot.

16. A base station configured to transmit a physical uplink control channel (PUCCH) signal in a wireless communication system, the user equipment comprising:
a radio frequency (RF) unit configured for transmitting information; and
a processor configured for:
transmitting a Radio Resource Control (RRC) signal including PUCCH resource information;
receiving a first and third plurality of sequences in a first slot of a subframe through different antenna ports using the PUCCH resource information, each sequence of the first and third plurality of sequences mapped on a corresponding single carrier frequency division multiple access (SC-FDMA) symbol in the first slot; and
receiving a second and fourth plurality of sequences in a second slot of the subframe through different antenna ports using the PUCCH resource information, each sequence of the second and fourth plurality of sequences mapped on a corresponding SC-FDMA symbol in the second slot,
wherein the first plurality of sequences are generated by spread of first $N_1/2$ modulation symbols of $N_1$ modulation symbols using a first orthogonal code, each sequence of the first plurality of sequences including the first $N_1/2$ modulation symbols, and $N_1$ being twice a number of subcarriers in one resource block (RB),
wherein the second plurality of sequences are generated by spread of second $N_1/2$ modulation symbols of the $N_1$ modulation symbols using a second orthogonal code, each sequence of the second plurality of sequences including the second $N_1/2$ modulation symbols,
wherein the third plurality of sequences are generated by spread of the first $N_1/2$ modulation symbols of the $N_1$ modulation symbols using a third orthogonal code, each sequence of the third plurality of sequences including the first $N_1/2$ modulation symbols,
wherein the fourth plurality of sequences are generated by spread of the second $N_1/2$ modulation symbols of the $N_1$ modulation symbols using a fourth orthogonal code, each sequence of the fourth plurality of sequences including the second $N_1/2$ modulation symbols.

17. The base station of claim 16, wherein each sequence of the first plurality of sequences, the second plurality of sequences, the third plurality of sequences and the fourth plurality of sequences is discrete Fourier transformed.

18. The base station of claim 16, wherein:
the first orthogonal code is different from the third orthogonal code; and
the second orthogonal code is different from the fourth orthogonal code.

19. The base station of claim 16, wherein:
the first and third plurality of sequences are received using different RBs in the first slot; and
the second and fourth plurality of sequences are received using different RBs in the second slot.

20. The base station of claim 18, wherein:
the first and third plurality of sequences are received using a same RB in the first slot; and
the second and fourth plurality of sequences are received using a same RB in the second slot.

* * * * *